United States Patent
Ito et al.

(10) Patent No.: US 8,464,766 B2
(45) Date of Patent: Jun. 18, 2013

(54) CASSETTE GAS CYLINDER MOUNTING STRUCTURE

(75) Inventors: Tomoki Ito, Wako (JP); Takayuki Sato, Wako (JP); Tomomi Nakaya, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 864 days.

(21) Appl. No.: 12/622,236

(22) Filed: Nov. 19, 2009

(65) Prior Publication Data
US 2010/0126595 A1 May 27, 2010

(30) Foreign Application Priority Data
Nov. 26, 2008 (JP) .................. 2008-301482

(51) Int. Cl.
B65B 1/04 (2006.01)
B65B 3/00 (2006.01)
B67C 3/00 (2006.01)

(52) U.S. Cl.
USPC ........... 141/347; 141/352; 141/363; 141/366; 141/370

(58) Field of Classification Search
USPC ................ 141/346, 347, 352, 363, 365, 366, 141/369, 370, 372; 137/376
See application file for complete search history.

(56) References Cited

U.S. PATENT DOCUMENTS

| | | | | |
|---|---|---|---|---|
| 5,515,997 A * | 5/1996 | Kirk et al. | ...................... | 220/562 |
| 5,937,920 A * | 8/1999 | Simmel et al. | ................. | 141/346 |
| 5,947,172 A * | 9/1999 | Glotin | ........................... | 141/383 |
| 6,516,839 B1 * | 2/2003 | Timp et al. | ..................... | 141/347 |
| 7,434,603 B2 * | 10/2008 | Spear et al. | ..................... | 141/363 |
| 8,066,081 B2 * | 11/2011 | Ito et al. | ........................... | 172/42 |
| 8,074,618 B2 * | 12/2011 | Kobayashi | ................ | 123/195 A |
| 8,191,659 B2 * | 6/2012 | Kobayashi et al. | ........... | 180/19.1 |
| 8,201,652 B2 * | 6/2012 | Ito et al. | ........................ | 180/69.5 |
| 2009/0126680 A1 * | 5/2009 | Kobayashi | ................ | 123/198 R |
| 2009/0293837 A1 * | 12/2009 | Ito et al. | ..................... | 123/198 R |
| 2009/0302038 A1 * | 12/2009 | Taggart et al. | ................ | 220/260 |

FOREIGN PATENT DOCUMENTS

| | | |
|---|---|---|
| FR | 2 882 011 A1 | 2/2005 |
| JP | 60-123503 U | 8/1985 |
| JP | 2-140508 A | 5/1990 |
| JP | 3-93303 U | 9/1991 |
| JP | 10-131809 A | 5/1998 |
| JP | 2001-000891 A | 1/2001 |
| JP | 2008-169881 A | 7/2008 |

* cited by examiner

Primary Examiner — Timothy L Maust
Assistant Examiner — Brandon J Warner
(74) Attorney, Agent, or Firm — Arent Fox LLP

(57) ABSTRACT

Cylinder mounting mechanism is provided in a working machine for mounting thereto a cylinder case having a cassette gas cylinder accommodated therein. Mouthpiece support section is provided in the mounting mechanism for supporting a mouthpiece portion of the cassette gas cylinder in the cylinder case. Fitting recessed portion is provided in one end portion of the cylinder case and capable of receiving the mouthpiece support section, the fitting recessed portion being defined by an inner peripheral wall part of the one end portion that has a tapering wall thickness such that the surface of the wall part slants gradually outwardly toward the distal end of the fitting recessed portion.

2 Claims, 18 Drawing Sheets

CASSETTE GAS CYLINDER MOUNTING STRUCTURE

FIELD OF THE INVENTION

The present invention relates to cassette gas cylinder mounting structures where a cassette gas cylinder is accommodated in a cylinder case and the cylinder case is mounted to a cylinder mounting mechanism.

BACKGROUND OF THE INVENTION

Among the conventionally-known cultivating (tilling) machines and other similar working machines are ones which include a gas engine mounted on the machine body, a handle post extending rearwardly and upwardly from the machine body and a storage case provided along the handle post, and in which an entire cassette gas cylinder is accommodated in the storage case with a case lid opened and the engine is driven by fuel gas supplied from the cassette gas cylinder. One example of such working machines is a gas-engine-mounted working machine disclosed in JP 10-131809 A.

In the gas-engine-mounted working machine disclosed in JP 10-131809 A, a mouthpiece support section is provided for supporting a mouthpiece portion of the cassette gas cylinder in place within the storage case, and the mouthpiece portion of the cassette gas cylinder stored in the storage case is mounted to the mouthpiece support section. With the mouthpiece portion of the cassette gas cylinder mounted to the mouthpiece support section, a nozzle of the mouthpiece portion is pressed against the mouthpiece support section, and fuel gas contained in the cassette gas cylinder is supplied from the cassette gas cylinder to the gas engine via the nozzle. In mounting the mouthpiece portion of the cassette gas cylinder to the mouthpiece support section, it is necessary to positionally adjust the nozzle of the mouthpiece portion with respect to a fuel gas flow passage of the mouthpiece support section, i.e. align the nozzle with the fuel gas flow passage.

Further, a nozzle receiving portion (recessed portion) for receiving the nozzle is formed in the mouthpiece support section, and the fuel gas flow passage opens out to the nozzle receiving portion. Therefore, it is difficult to align the nozzle of the mouthpiece portion with the fuel gas flow passage, and thus, mounting the mouthpiece portion to the mouthpiece support section tends to require much time and effort.

SUMMARY OF THE INVENTION

In view of the foregoing prior art problems, it is an object of the present invention to provide an improved cassette gas cylinder mounting structure which allows a mouthpiece portion of a cassette gas cylinder to be readily mounted to a mouthpiece support section without requiring much time and effort.

In order to accomplish the above-mentioned object, the present invention provides an improved cassette gas cylinder mounting structure for use in a working machine, which comprises: a cylinder mounting mechanism provided in the working machine for mounting thereto a cylinder case having a cassette gas cylinder accommodated therein; a mouthpiece support section provided in the cylinder mounting mechanism for supporting a mouthpiece portion of the cassette gas cylinder accommodated in the cylinder case; and a fitting recessed portion provided in one end portion of the cylinder case and capable of receiving the mouthpiece support section, the fitting recessed portion being defined by an inner peripheral wall part of the one end portion that has a wall thickness tapering so that the surface of the inner peripheral wall part slants gradually outwardly toward the distal end of the fitting recessed portion.

Thus, when the cylinder case having the cassette gas cylinder accommodated therein is to be mounted to the cylinder mounting mechanism, the mouthpiece portion can be automatically guided into coaxial alignment with the mouthpiece support section by the surface of the inner peripheral wall part functioning as a mounting guide surface. Therefore, the mouthpiece portion of the cassette gas cylinder can be automatically guided into coaxial alignment with the mouthpiece support section by a human operator only appropriately positioning the inner peripheral wall part with respect to the mouthpiece support section of the cylinder mounting mechanism.

Further, with the inner peripheral wall part having the afore-mentioned tapering wall thickness, the distal end of the fitting recessed portion can have an increased inner diameter. In this way, when the cylinder case is to be mounted to the cylinder mounting mechanism, the mouthpiece portion of the cassette gas cylinder accommodated in the cylinder case can be readily mounted to the mouthpiece support section without requiring much time and effort.

Preferably, the cylinder mounting mechanism further includes: a cylinder case mounting body, a cylinder case retaining rod pivotably mounted on the cylinder case mounting body and normally spring-urged toward the cylinder case mounting body so that the cylinder case having the cassette gas cylinder accommodated therein can be securely resiliently pressed against the cylinder case mounting body; and a shutter member pivotably mounted on the cylinder case mounting body and normally spring-urged to close the mouthpiece support section while no cylinder case is being mounted to the cylinder mounting mechanism.

Preferably, the cassette gas cylinder mounting structure of the present invention further comprises an interlocking section for interlocking pivotal movement of the shutter member to pivotal movement of the cylinder case retaining rod.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

In the following description, the terms "front", "rear", "left" and "right" are used to refer to directions as viewed from a human operator.

Figure 1:
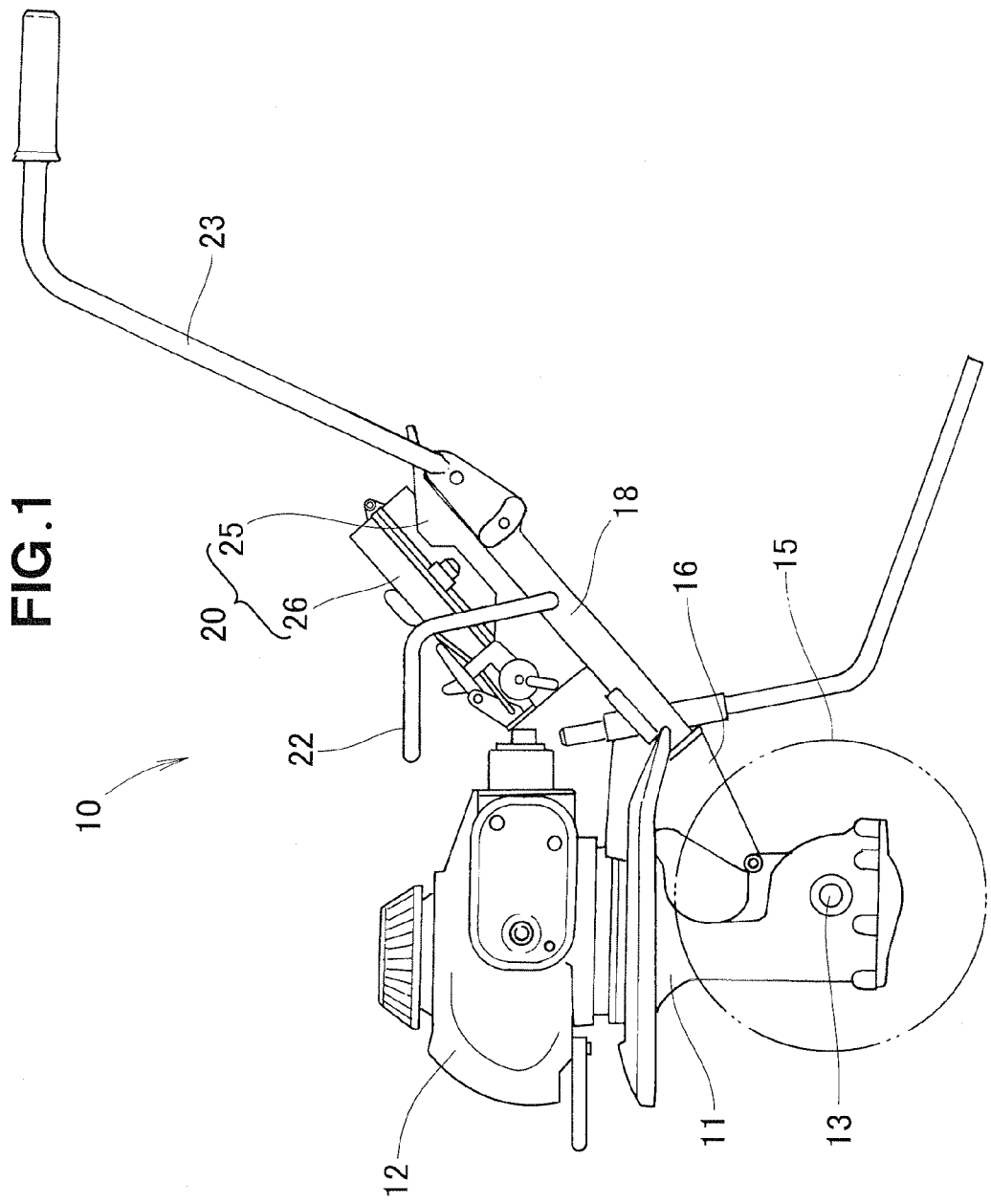
FIG. 1 is a side view showing a working machine provided with an embodiment of a cassette gas cylinder mounting structure of the present invention.

FIG. 1 is a side view showing a working machine provided with an embodiment of a cassette gas cylinder mounting structure of the present invention. The working machine 10 illustrated here is a walk-behind cultivating machine which includes: a gas engine 12 mounted on an upper end portion of a machine body 11; a cultivating shaft 13 disposed under the gas engine 12; a plurality of cultivating claws 15 mounted on the cultivating shaft 13; a support bracket 16 fixed to the machine body 11; a handle column 18 extending rearwardly and upwardly from the support bracket 16; a cassette gas cylinder mounting structure 20 fixed to the handle column 18; a cassette gas cylinder 21 (see FIG. 9) mounted to the cassette gas cylinder mounting structure 20; a carrying handle 22 mounted around the gas cylinder mounting structure 20; and an operating handle 23 mounted to an upper end portion of the handle column 18.

Driving power of the gas engine 12 is transmitted to the cultivating shaft 13 to rotate the cultivating shaft 13 so that the walk-behind working machine 10 can travel while cultivating the soil by means of the plurality of cultivating claws 15. The gas engine 12 is driven by liquid fuel gas (hereinafter referred to as "fuel") supplied from the gas cylinder 21.

Figure 2:
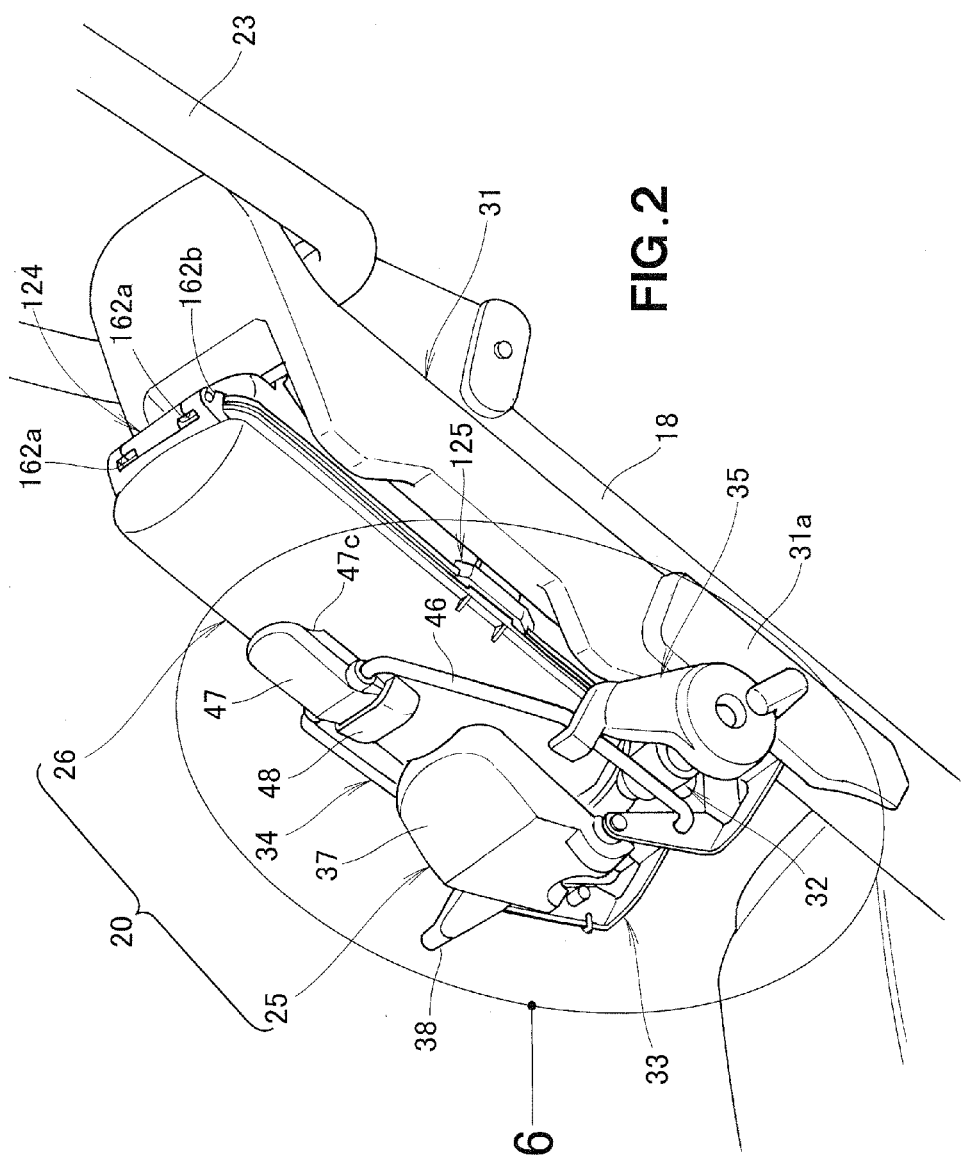
FIG. 2 is a perspective view showing the cassette gas cylinder mounting structure of the present invention.
Figure 3:
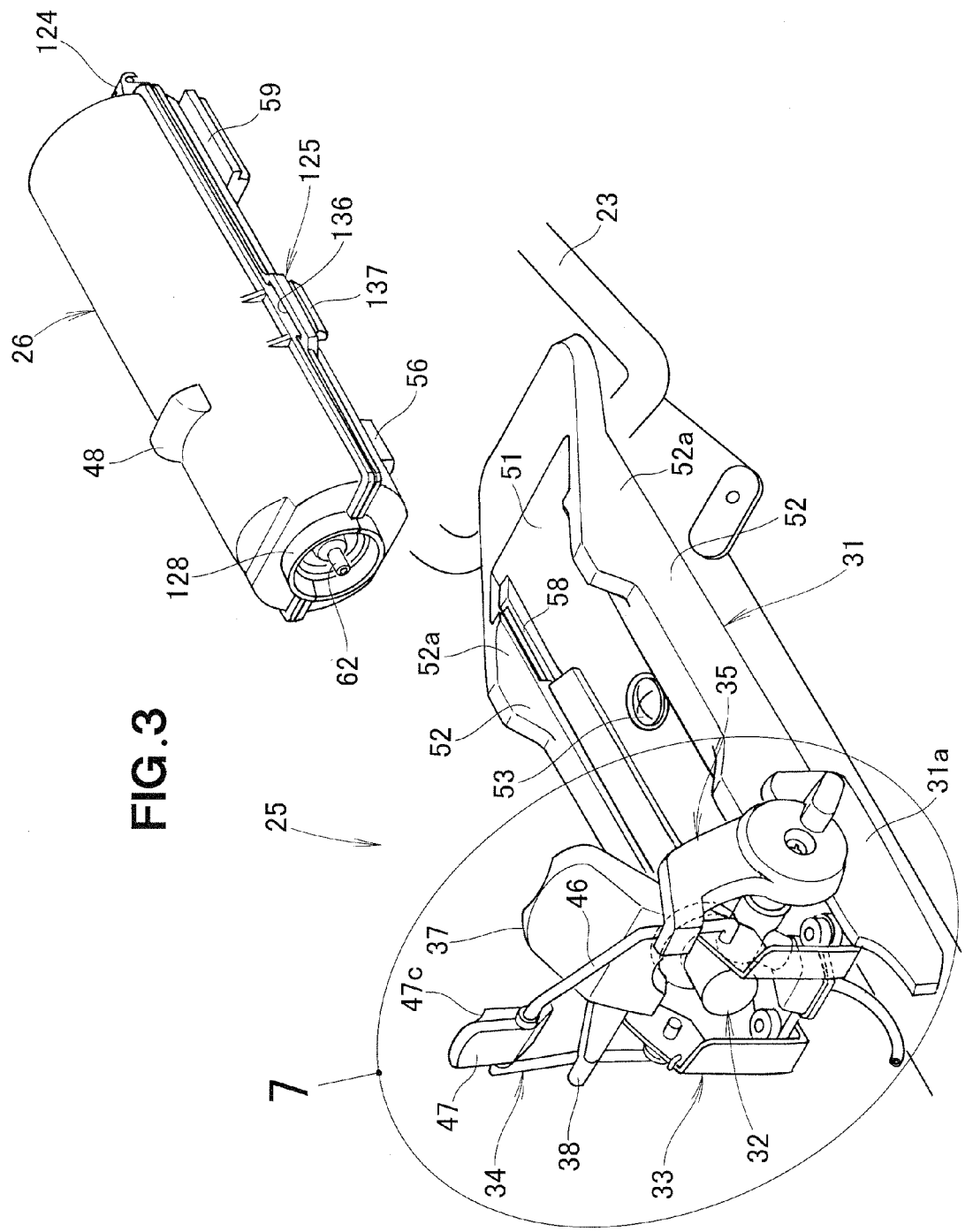
FIG. 3 is a perspective view showing the cassette gas cylinder mounting structure with a gas cylinder case detached therefrom.

FIG. 2 is a perspective view showing the cassette gas cylinder mounting structure 20, and FIG. 3 is a perspective view showing the cassette gas cylinder mounting structure 20 with a gas cylinder case detached therefrom. In FIG. 2, the carrying handle 22 is not shown to facilitate understanding of a construction of the cassette gas cylinder mounting structure 20.

The cassette gas cylinder mounting structure 20 includes a receiver mechanism (i.e., cylinder mounting mechanism) 25 provided in the working machine 10, and a gas cylinder case 26. The gas cylinder case 26 having the gas cylinder 21 accommodated therein is detachably mounted to the receiver mechanism 25, so that the gas cylinder 21 is detachably mounted to the receiver mechanism 25.

The receiver mechanism 25 includes: a receiver body (i.e., cylinder case mounting body) 31 fixed to the handle column 18; a mouthpiece support section/shifting valve unit 32 provided on a distal end portion 31a of the receiver body (i.e., cylinder case mounting body) 31; a support bracket 33 provided on the distal end portion 31a of the receiver body 31; a case retaining section (cylinder retaining section) 34 provided on the support bracket 33; a valve interlocking section 35 for interlocking the shifting valve 43 of the mouthpiece support section/shifting valve unit 32 to the case retaining section 34; a shutter member 37 provided on the support bracket 33 of the receiver body 31; and a shutter interlocking section 38 for interlocking the shutter member 37 to the case retaining section 34.

The gas cylinder case 26 can be received and retained on the receiver mechanism 25 by a pivotable cylinder case retaining rod 46 of the receiver mechanism 25 being placed in a retaining position (i.e., position shown in FIG. 2) and a locking fastener 47 of the retaining rod 46 being brought into locking engagement by an engaging portion 48.

By the gas cylinder case 26 being retained by the receiver mechanism 25, the cassette gas cylinder 21 can be retained mounted to the working machine 10. The gas cylinder case 26 can be detached from the receiver mechanism 25 by the cylinder case retaining rod 46 being disengaged from the engaging portion 48 and then brought to an opening position (i.e., position of FIG. 3).

The receiver body 31 includes a bottom section 51 and left and right side wall sections 52. The bottom section 51 is fixed at its front end and middle portions to the handle column 18 by means of bolts 53 (only the bolt 53 of the middle portion is shown in FIG. 3). Namely, the receiver body 31 is bolted to the handle column 18 to extend along the handle column 18 with a falling gradient toward the front of the machine.

Figure 10:
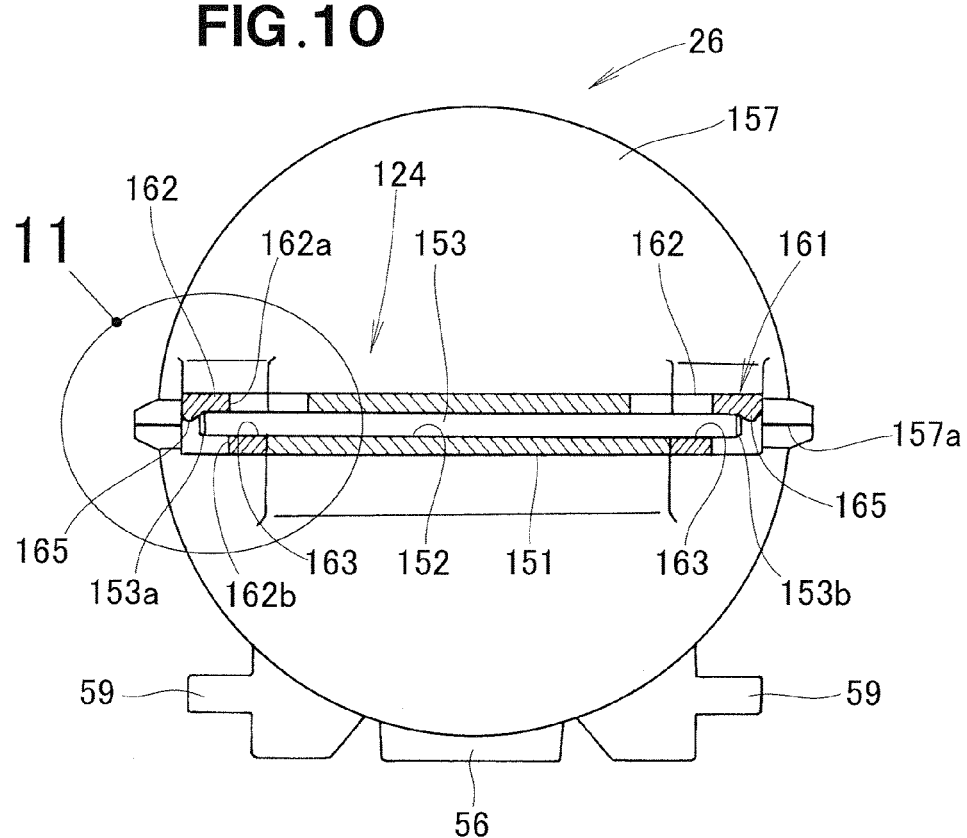
FIG. 10 is a sectional view showing a hinge section of the gas cylinder case.

The left and right side wall sections 52 have left and right slider guide portions 58 (only the right slider guide portion 58 is shown in FIG. 3) at their respective rear end portions 52a. The left and right slider guide portions 58 are in the form of guide grooves for guiding left and right sliders 59 (only the right slider 59 is shown in FIG. 3, and the left slider 59 is shown in FIG. 10), provided on the gas cylinder case 26, to a predetermined mounted position.

Figure 4:
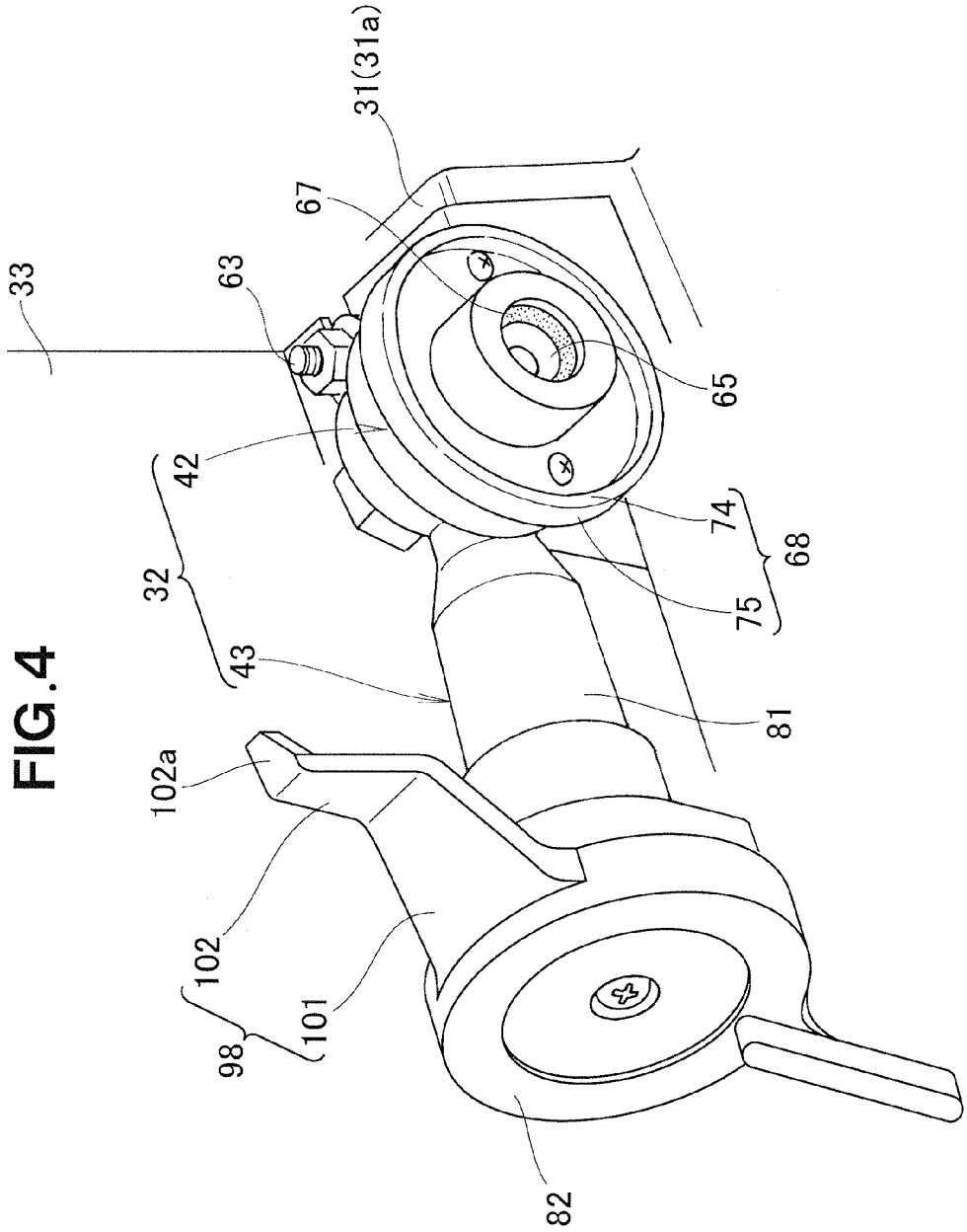
FIG. 4 is a perspective view showing a mouthpiece support section/shifting valve unit employed in the cassette gas cylinder mounting structure of the present invention.
Figure 5:
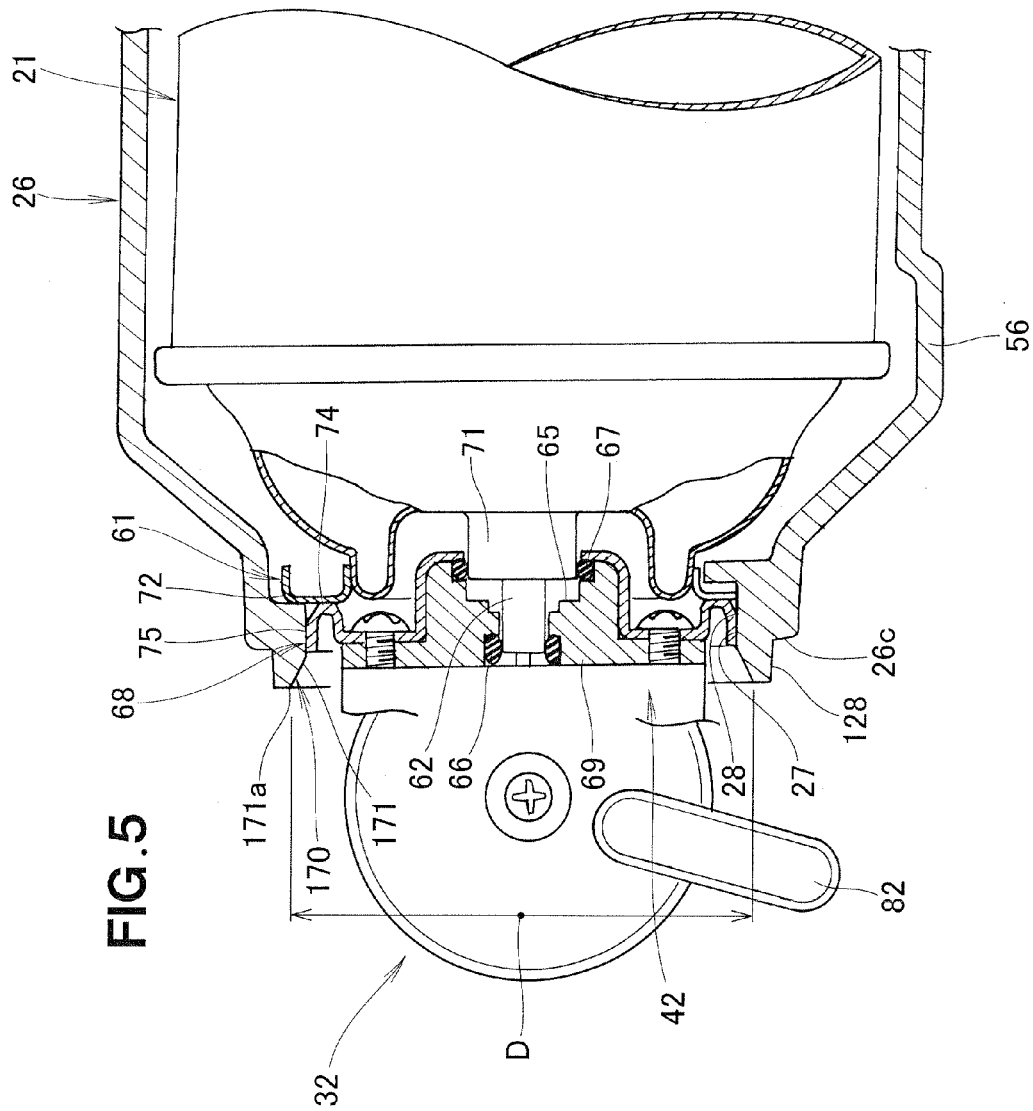
FIG. 5 is a sectional view showing the mouthpiece support section/shifting valve unit having the cassette gas cylinder mounted thereto.

FIG. 4 is a perspective view showing the mouthpiece support section/shifting valve unit 32 employed in the instant embodiment of the present invention, and FIG. 5 is a sectional view showing the mouthpiece support section/shifting valve unit 32 having a cassette gas cylinder 21 mounted thereto.

Figure 7:
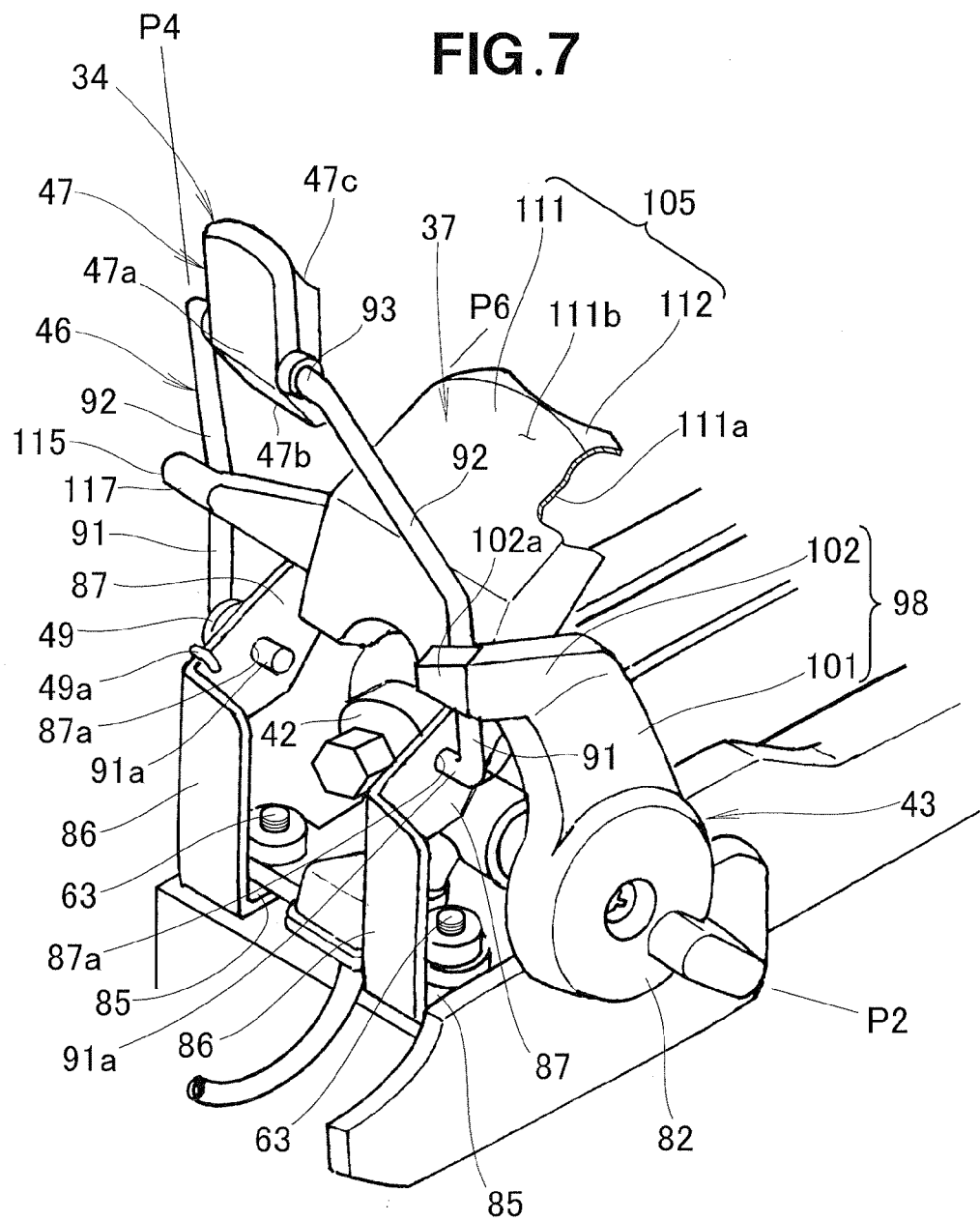
FIG. 7 is an enlarged view of a section encircled at 7 in FIG. 3.

The mouthpiece support section/shifting valve unit 32 is an integral unit that includes a mouthpiece support section 42 for supporting a mouthpiece portion 61 of the cassette gas cylinder 21 accommodated in the cylinder case 26 and the shifting valve 43 for opening and closing a fuel flow passage (not shown) of the mouthpiece support section 42. The mouthpiece support section/shifting valve unit 32 is fixed to the distal end portion 31a of the receiver body 31 by means of a pair of left and right bolts 63 (only the right bolt 63 is shown in FIG. 4, and the left bolt 63 is shown in FIG. 7).

The mouthpiece support section 42, provided for supporting the mouthpiece portion 61 of the cassette gas cylinder 21 accommodated in the cylinder case 26, includes a nozzle receiving portion 65, inner and outer O rings 66 and 67 (FIG. 5) disposed within the nozzle receiving portion 65, and a flange receiving portion 68. These nozzle receiving portion 65, outer O-rings 66 and 67 and flange receiving portion 68 are disposed concentrically with one another.

The nozzle receiving portion 65 is a recessed portion for receiving a nozzle 62 of the cassette gas cylinder 21. The inner O-ring 66 is an annular seal abutting against the nozzle 62 of the cassette gas cylinder 21, while the outer O-ring 67 is an annular seal abutting against a nozzle support portion 71 of the cassette gas cylinder 21.

The flange receiving portion 68 of an annular shape bulges outwardly from a base 69 of the mouthpiece support section 42 and has a substantially U axial sectional shape. The flange receiving portion 68 includes a top portion 74 for supporting a flange 72 of the mouthpiece portion 61 of the cassette gas cylinder 21, and an outer peripheral wall portion 75 fittable in an inner peripheral wall portion 28 (see also FIG. 8) of the gas cylinder case 26. The inner peripheral wall portion 28 of the gas cylinder case 26 defines an opening portion 27 (see also FIG. 8).

The top portion 74 of the flange receiving portion 68 abuts against the flange 72 of the mouthpiece portion 61 to support the mouthpiece portion 61. The outer peripheral wall portion 75 fits into the inner peripheral wall portion 28 of the gas cylinder case 26 to hermetically close the opening portion 27 of the gas cylinder case 26.

The shifting valve 43 includes a cock body 81 integrally formed with the mouthpiece support section 42, and a valve body (not shown) provided within the cock body 81 and having an operating lever 82 provided thereon. The valve body is provided in such a manner that the fuel flow passage within the cock body 81 can be opened by the operating lever 82 being shifted to a fuel supply position P1 (see FIG. 6). In this manner, the shifting valve 43 is held in a fuel supply position or state for supplying the fuel, contained in the gas cylinder case 26, to the gas engine 12 (see FIG. 1).

The fuel flow passage within the cock body 81 can be closed by the operating lever 82 being shifted to a fuel block position P2 (see FIG. 7). In this manner, the shifting valve 43 is held in a fuel block state for preventing supply of the fuel to the gas engine 12.

Figure 6:
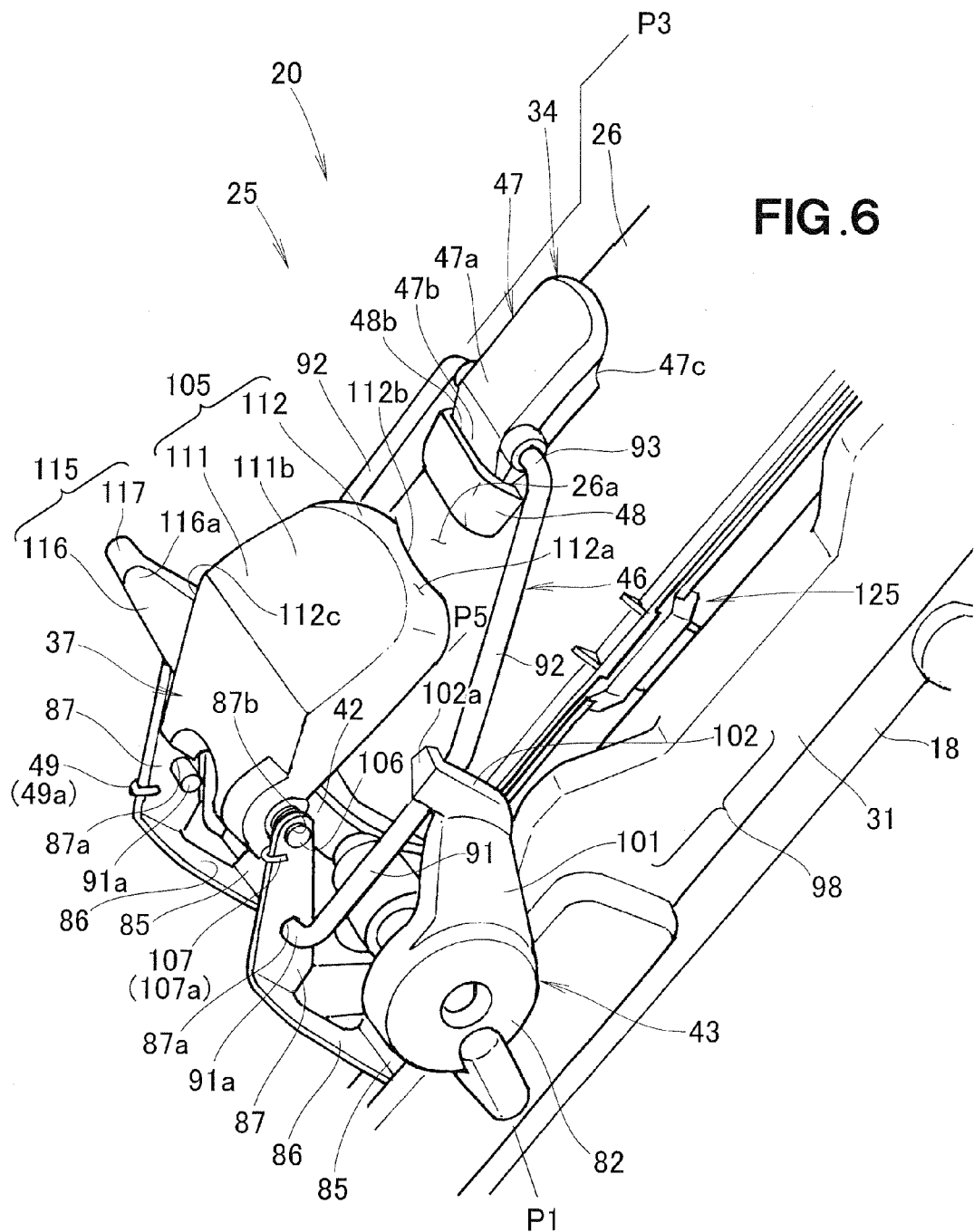
FIG. 6 is an enlarged view of a section encircled at 6 in FIG. 2.

FIG. 6 is an enlarged view of a section encircled at 6 in FIG. 2, and FIG. 7 is an enlarged view of a section encircled at 7 in FIG. 3. The support bracket 33, which is integrally formed by bending a flat plate, supports the case retaining section (cylinder retaining section) 34 and shutter member 37.

The support bracket 33 includes: a base portion 85 fixed to a front end portion of the receiver body 31 by means of the bolts 63 (only the right bolt 63 is shown in FIG. 4); left and right retaining force generation portions 86 projecting upward from left and right edge portions of the base portion 85; a left extension portion 87 extending with a rising gradient from the left retaining force generation portion 86 toward the rear of the machine; and a right extension portion 87 extending with a rising gradient from the right retaining force generation portion 86 toward the rear of the machine.

Each of the left and right retaining force generation portions 86 functions as a leaf spring resiliently deformable toward the cassette gas cylinder 21 (gas cylinder case 26) in a state where the gas cylinder case 26 is retained by the case retaining section 34. By resiliently deforming the left and right retaining force generation portions 86 toward the cassette gas cylinder 21, force for retaining the gas cylinder case 26 on the receiver mechanism 25 can be produced.

The left and right extension portions 87 have left and right front mounting holes 87a formed in their respective front end portions and have left and right rear mounting holes 87b (only the left rear mounting hole 87b is shown in FIG. 6) formed in their respective rear end portions. The case retaining section 34 is pivotably supported at its front end portions in the left and right front mounting holes 87a, and the shutter member 37 is pivotably supported at its front end portions in the left and right rear mounting holes 87b. Namely, the retaining rod 46 is pivotably mounted at its front end portions on the bracket 34 of the receiver body 31 by means of the front mounting holes 87a, and the shutter member 37 is pivotably mounted at its front end portions on the bracket 34 by means of the rear mounting holes 87b.

Figure 12A:
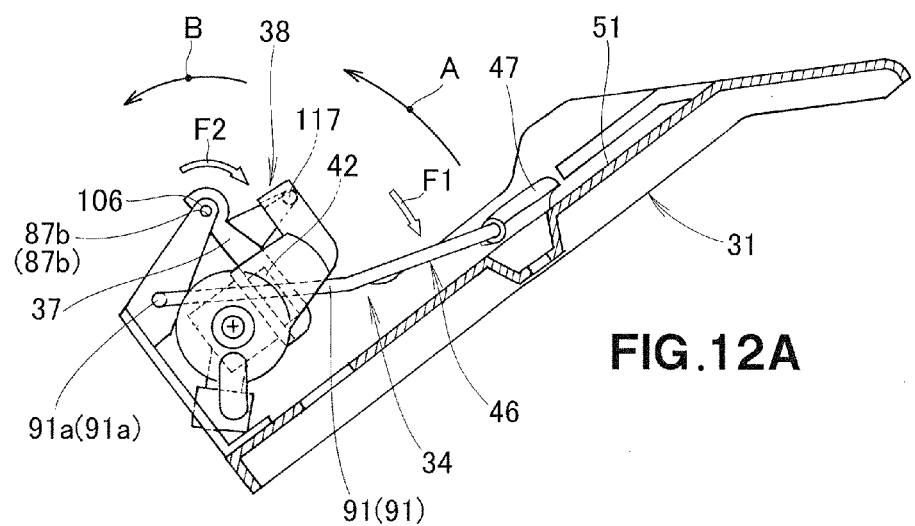
FIGS. 12A and 12B are explanatory of an example manner in which a case retaining section of a receiver mechanism is lifted to an evacuated position.

The left and right rear mounting holes 87b are located above the mouthpiece support section 42 (see also FIG. 12A). Thus, the shutter member 37 has a pivot axis located above the mouthpiece support section 42.

The case retaining section 34 includes the retaining rod 46 pivotably supported at its front end portions in the left and right front mounting holes 87a, the locking fastener 47 pivotably mounted on the retaining rod 46, and a spring member 49 for normally urging the retaining rod 46 toward the receiver body 31 so that the gas cylinder case 26 can be resiliently pressed against the receiver body 31 and thus can be securely mounted to the receiver body 31.

The case retaining section 34 is shiftable between a position for causing the cassette gas cylinder 21 (gas cylinder case 26) to be retained by the mouthpiece support section/shifting valve unit 32 and a position for canceling the retention, by the mouthpiece support section/shifting valve unit 32, of the cassette gas cylinder 21 (gas cylinder case 26).

The retaining rod 46 includes left and right leg portions 91 having respective proximal end portions 91a pivotably supported in the left and right front mounting holes 87a, and left and right slanting portions 92 extend from respective distal ends of the left and right leg portions 91. Respective distal ends (or upper ends) of the left and right slanting portions 92 are interconnected via a connecting portion 93.

The left and right leg portions 91 of the retaining rod 46 are located outside of the gas cylinder case 26. The left and right slanting portions 92 extend upwardly from outside of the gas cylinder case 26 toward the longitudinal center line of the gas cylinder case 26 in such a manner that the connecting portion 93 can be positioned to engage with the engaging portion 48 of the gas cylinder case 26.

The spring member 49 for normally urging the retaining rod 46 toward the cylinder case 26 is wound on a portion of the proximal end portion 91a of the right leg portion 91 between the right extension portion 87 and the right leg portion 91, and the spring member 49 has one end portion 49a engaged by the right extension portion 87 and another end portion (not shown) engaged by the right leg portion 91.

The locking fastener 47, which is pivotally mounted on the connecting portion 93 of the retaining rod 46, has a distal end portion 47a, an engaging end (lower end) 47b engageable with the engaging portion 48, and a finger-putting portion 47c on which the human operator puts his finger(s). The engaging end 47b is engageable with the engaging portion 48 of the gas cylinder case 26 when the retaining rod 46 is placed in a retention position P3. The locking fastener 47 can be released from the finger-putting portion 47c by the human operator pivotally lifting the locking fastener 47 with his finger(s) put on the finger-putting portion 47c.

The instant embodiment, where the left and right retaining force generation portions 86 are provided on the support bracket 33 supporting the case retaining section 34, retains the cassette gas cylinder 21 (gas cylinder case 26) by resiliently deforming the retaining force generation portions 86. By such resilient deformation, there is produced a restoring force that acts to return the left and right retaining force generation portions 86 to their original positions. The restoring force of the left and right retaining force generation portions 86 acts on the cassette gas cylinder 21 via the gas cylinder case 26, so that the cassette gas cylinder 21 can be retained reliably.

Because part of the support bracket 33, namely, the left and right retaining force generation portions 86, is designed to function as a resilient deformation section, it is possible to dispense with spring members that would be required for retaining the cassette gas cylinder 21 (gas cylinder case 26). As a result, it is possible to reduce the number of necessary component parts and thereby simplify the construction and reduce manufacturing cost of the cassette gas cylinder mounting structure.

The valve interlocking section 35 includes a follower section 98 projecting from the operating lever 82. The follower section 98 includes a following base portion 101 projecting from the operating lever 82 toward the left leg portion 91, and a following locking portion 102 provided on the following base portion 101. The following locking portion 102, which has a generally inverted-L shape, has a bent portion 102a engageable with the left leg portion 91 from the front of the machine.

In the valve interlocking section 35, the bent portion 102a abuts against the left leg portion 91 as the operating lever 82 is shifted to the fuel supply position P1 (see FIG. 6) with the cassette gas cylinder 21 retained by the case retaining section 34.

The operating lever 82 can be shifted from the fuel supply position P1 to the fuel block position P2 (see FIG. 7) by the left leg portion 91 moving the bent portion 102a as the case retaining section 34 (more specifically, the retaining rod 46) is moved to a cancellation position P4 (see FIG. 7) for canceling retention of the cassette gas cylinder 21.

Namely, by the provision of the valve interlocking section 35, the shifting valve 43 can be shifted from the fuel supply position to the fuel block position in interlocked relation to movement of the retaining rod 46 as the retention, by the case retaining section 34, of the cassette gas cylinder 21 is canceled.

The shutter member 37 includes a shutter body 105 for closing the mouthpiece support section 42, a support pin (support shaft) 106 mounting the shutter body 105 on the left and right extension portions 87 (more specifically, the left and right rear mounting holes 87b), a shutter spring member 107 normally urging the shutter body 105 toward the mouthpiece support section 42 to thereby normally urge the shutter member 37 to a closing position P5 (see FIG. 6).

The shutter spring member 107 is wound on a portion of the support pin 106 between the left extension portion 87 and the shutter member 37, and the shutter spring member 107 has one end portion 107a engaged by the left extension portion 87 and another end portion (not shown) engaged by the shutter member 37.

The shutter body 105 is pivotably supported at its front end portions by the left and right rear mounting holes 87b via the support pin 106, and it closes the mouthpiece support section 42 by the biasing force of the shutter spring member 107 when the cassette gas cylinder 21 (gas cylinder case 26) is detached from the receiver mechanism 25.

The shutter body 105 includes a plate portion 111 of a generally rectangular shape for closing the mouthpiece support section 42, and a peripheral side wall 112 bent from the outer periphery of the plate portion 111. More specifically, the peripheral side wall 112 projects away from the rear surface 111a of the plate portion 111, and it has a recessed portion 112b formed in its rear wall portion 112a so as to extend along an upper wall 26a of the gas cylinder case 26. Thus, the recessed portion 112b of the peripheral side wall 112 of the shutter body 105 can be fitted over the upper wall 26a of the gas cylinder case 26.

In the aforementioned state, the peripheral side wall 112 abuts against the upper wall 26a of the gas cylinder case 26. Thus, it is possible to retain the rear surface 111a of the plate portion 111 in a substantially hermetically closed state by means of the peripheral side wall 112 and upper wall 26a of the gas cylinder case 26, so that foreign matters, such as sand and dust, can be prevented from adhering to the rear surface 111a of the plate portion 111.

The left and right rear mounting holes 87b are located above the mouthpiece support section 42 as noted above, and thus, the supported pin 106 is located above the mouthpiece support section 42. Therefore, the shutter body 105 can close and open the mouthpiece support section 42 from above the mouthpiece support section 42. In this way, it is possible to prevent foreign matters, such as dust, from entering and adhering to the nozzle receiving portion 65 of the mouthpiece support section 42.

Because the support pin 106 of the shutter member 37 is located above the mouthpiece support section 42, the front surface 111b of the plate portion 111 faces upward while the rear surface 111a of the plate portion 111 faces downward, when the shutter member 37 is in its opening position. With the rear surface 111a of the plate portion 111 facing downward, it is possible to prevent foreign matters, such as sand and dust, from landing on the rear surface 111a.

Further, because the peripheral side wall 112 can be caused to abut against the upper wall 26a of the gas cylinder case 26 with the recessed portion 112b of the peripheral side wall 112 fitted over the upper wall 26a, it is possible to retain the rear surface 111a in a substantially hermetically closed state by means of the peripheral side wall 112 and upper wall 26a of the gas cylinder case 26, so that foreign matters, such as sand and dust, can be prevented from adhering to the rear surface 111a of the plate portion 111.

Because the instant embodiment can prevent foreign matters, such as sand and dust, from landing on the rear surface 111a of the plate portion 111 in the aforementioned manner, it can reliably prevent foreign matters, such as sand and dust, from entering the mouthpiece support section 42 (particularly, the nozzle receiving portion 65) when closing the mouthpiece support section 42 with the rear surface 111a of the plate portion 111.

When the human operator cancels retention, by the case retaining section 34, of the cassette gas cylinder 21 (gas cylinder case 26), the shutter interlocking section 38 shifts the shutter member 37 to the opening position in interlocking relation to the retention cancellation operation. The shutter interlocking section 38 includes an engaging member 115 engageable with the right leg portion 91 of the case retaining section 34.

The engaging member 115 includes a projecting portion 116 projecting upwardly from the peripheral side wall 112 (more specifically, front end portion of a right side wall portion 112c), and a projection 117 projecting substantially horizontally from the top 116a of the projecting portion 116 toward the right leg portion 91.

With the engaging member 115 formed integrally with the shutter member 37, the projection 117 can be caused to engage with the right leg portion 91, from the front of the machine, using the biasing force of the shutter spring member 107.

Thus, as the human operator operates the case retaining section 34 to cancel retention, by the case retaining section 34, of the cassette gas cylinder 21, the shutter member 37 can be shifted to the opening position P6 (FIG. 7) in interlocked relation to the human operator's retention cancellation operation, with a simple construction including only the engaging member 115.

Figure 8:
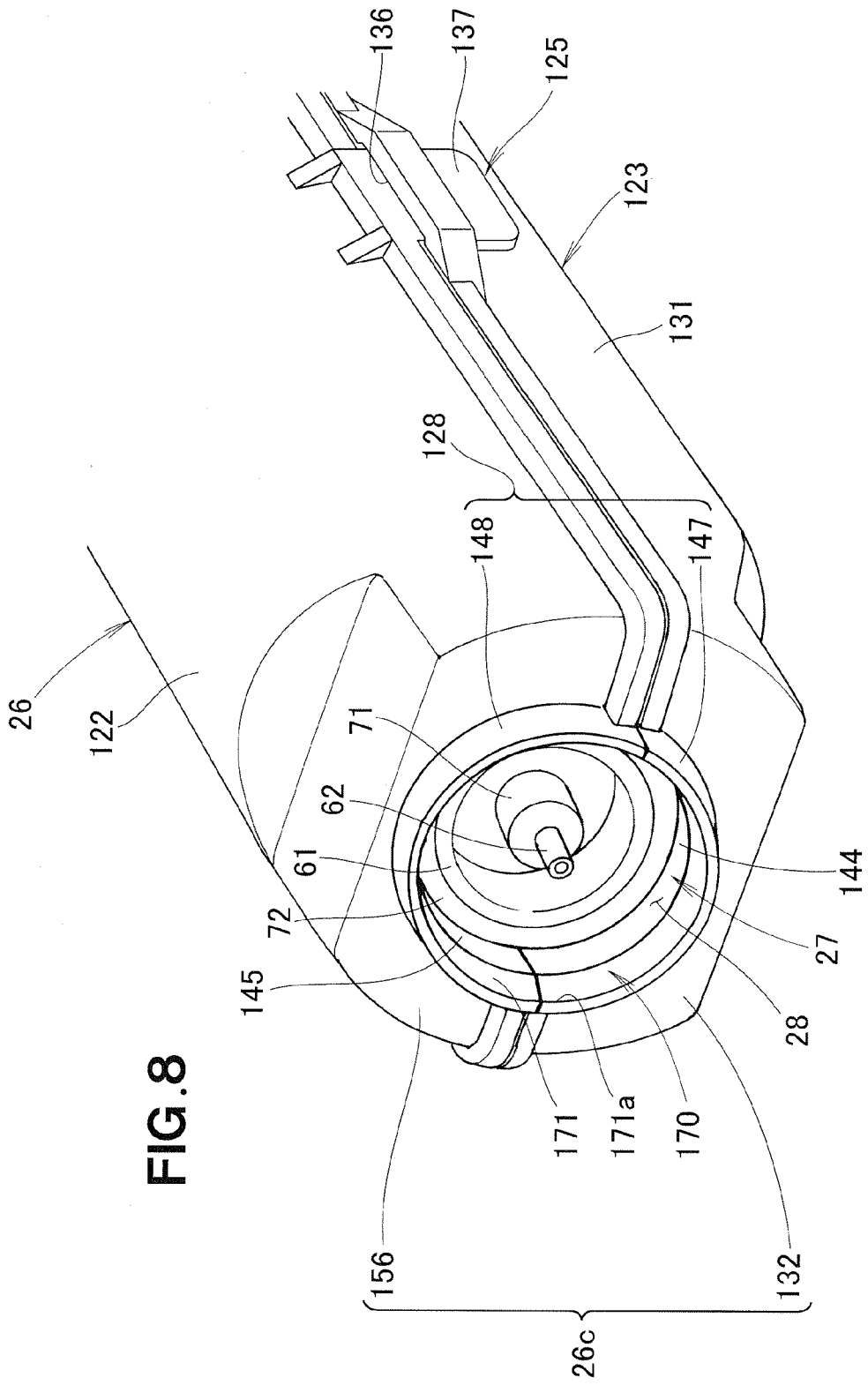
FIG. 8 is a perspective view showing the gas cylinder case employed in the cassette gas cylinder mounting structure.
Figure 9:
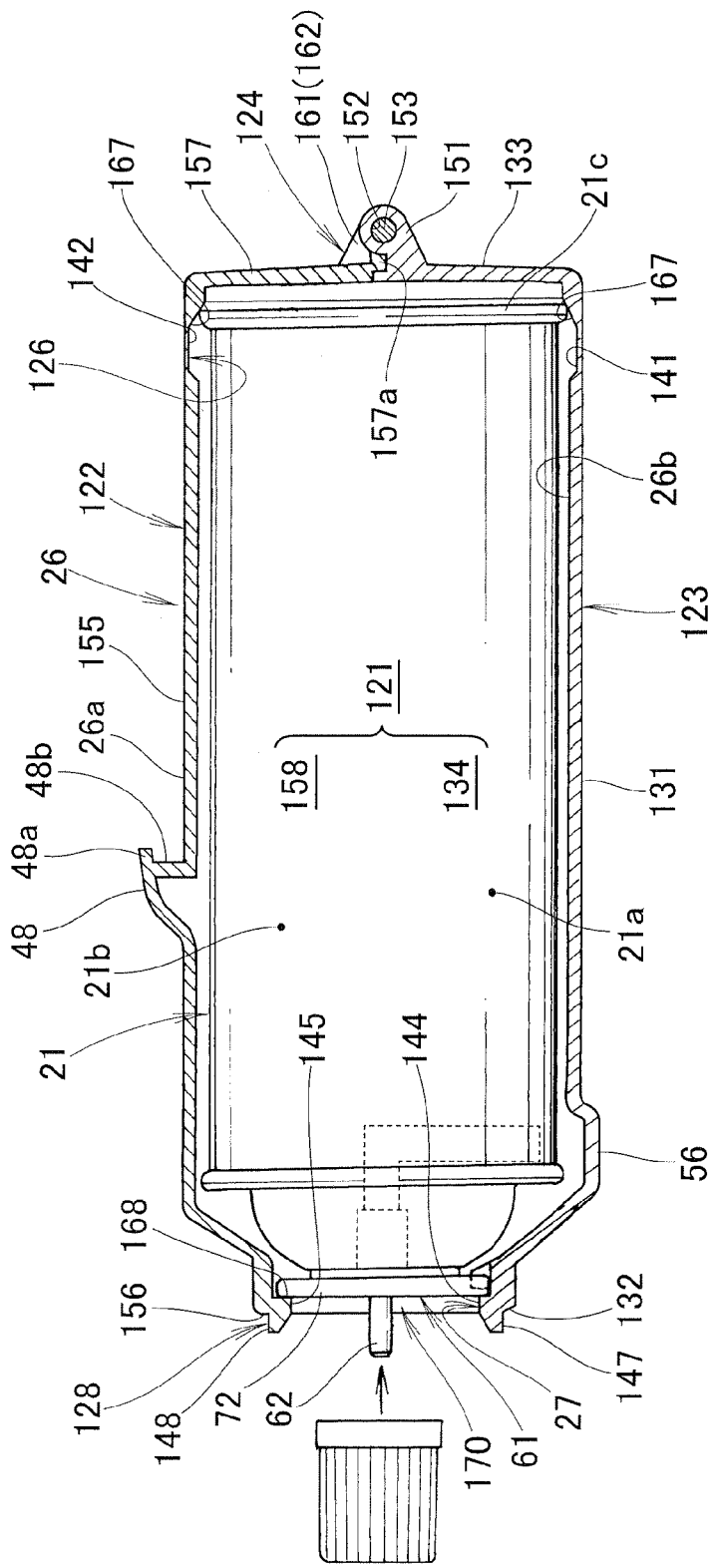
FIG. 9 is a sectional view of the gas cylinder case.

FIG. 8 is a perspective view showing the gas cylinder case 26 employed in the instant embodiment, and FIG. 9 is a sectional view of the gas cylinder case 26.

The gas cylinder case 26 is in the form of a substantially cylindrical hollow body including an interior space 121 capable of accommodating therein the cassette gas cylinder 21, which includes: a pair of case halves, i.e. upper and lower case halves 122 and 123; a hinge section 124 openably/closeably interconnecting the upper and lower case halves 122 and 123; a locking section 125 for holding the upper and lower case halves 122 and 123 in a closed state; an annular groove 126 for retaining the cassette gas cylinder 21; an opening portion 27 for exposing the mouthpiece portion 61 of the cassette gas cylinder 21 out of the front end of the case 26; and an annular bulged portion 128 provided along the peripheral edge of the opening portion 27.

The locking section 125 has left and right locking recesses 136 (only the left locking recess 136 is shown in FIG. 8) formed in the lower case half 123, and left and right locking claws 137 (only the left locking claw 137 is shown in FIG. 8) formed on and extending downward from the upper case half 122.

The annular groove 126 includes a lower annular groove portion 141 formed in the lower case half 123, and an upper annular groove portion 142 formed in the upper case half 122.

The opening portion 27 includes a lower opening recess 144 formed in the lower case half 123 to provide a lower half of the opening portion 27, and an upper opening recess 145 formed in the upper case half 122 to provided an upper half of the opening portion 27.

The annular bulged portion 128 includes a lower bulged portion 147 formed in the lower case half 123 to provide a lower half of the annular bulged portion 128, and an upper bulged portion 145 formed in the upper case half 122 to provide an upper half of the annular bulged portion 128. Details of the locking section 125, annular groove 126, opening portion 27 and annular bulged portion 128 will be discussed later.

The lower case half 123 has a lower peripheral wall portion 131 of a substantially semicircular sectional shape opening upwardly, a lower front wall portion 132 formed at the front end of the peripheral wall portion 131, and a lower rear wall portion 133 formed at the rear end of the peripheral wall portion 131. The lower peripheral wall portion 131 has a substantially semicircular sectional shape opening upwardly, and it defines a lower space 134 capable of accommodating a lower half 21a of the cassette gas cylinder 21. The lower peripheral wall portion 131 has a downward protruding portion 56 bulged downward from a front end portion of the lower peripheral wall portion 131, and the left and right sliders 59 (see FIG. 10) protruding from left and right rear side edge regions of the peripheral wall portion 131. The downward protruding portion 56 is a portion to be placed on the bottom section 51 of the receiver body 31.

The left and right sliders 59 are portions to be fitted in the left and right slider guide portions 58 (only the right slider guide portion 58 is shown in FIG. 3) of the receiver body 31 so that the gas cylinder case 26 is detachably attachable to the receiver body 31.

Further, the lower peripheral wall portion 131 of the lower case half 123 has the left and right locking holes 136 (only the left locking hole 136 is shown) formed in generally longitudinal middle regions of left and right side edge portions thereof, and the lower annular groove portion 141 formed in an inner peripheral surface of a rear end portion thereof.

The lower front wall portion 132 has the lower opening recess 144, and the lower bulged portion 147 is formed along the periphery of the lower opening recess 144. Further, the lower rear wall portion 133 has a lower hinge portion 151 of the hinge section 124 formed thereon, and the lower hinge portion 151 has a lower through-hole 152 (see also FIG. 10) formed along the upper surface of the lower rear wall portion 133. The lower through-hole 152 is a hole through which a hinge pin 153 can extend.

The upper case half 122 has an upper peripheral wall portion 155 of a substantially semicircular sectional shape opening downwardly, an upper front wall portion 156 formed at the front end of the peripheral wall portion 155, and an upper rear wall portion 157 formed at the rear end of the peripheral wall portion 155. The upper peripheral wall portion 155 has a substantially semicircular sectional shape opening downwardly, and it defines an upper space 158 capable of accommodating an upper half 21b of the cassette gas cylinder 21.

The upper peripheral wall portion 155 has the engaging portion 48 bulged upwardly from the upper wall 26a of the gas cylinder case 26. The engaging portion 48 has an engaging recess 48b in its rear end portion 48a. The gas cylinder case 26 can be retained by the receiver mechanism 25 shown in FIG. 6 by the locking end 47b (see FIG. 6) of the locking fastener 47 being engaged in the engaging recess 48b.

The upper peripheral wall portion 155 has left and right locking claws 137 formed thereon in generally longitudinal middle regions of left and right side edge portions thereof, and the upper annular groove portion 142 formed in an inner peripheral surface of a rear end portion thereof.

The upper front wall portion 156 has the upper opening recess 145, and the upper bulged portion 148 is formed along the periphery of the upper opening recess 145. Further, the upper rear wall portion 157 has an upper hinge portion 161 of the hinge section 124 formed thereon, and the upper hinge portion 161 comprises left and right upper hinge portions 162 formed on left and right end regions of a lower edge 157a of the rear wall portion 157 (see also FIG. 10).

The left and right upper hinge portions 162 has left and right upper through-holes 163 concentrically with the lower through-hole 152, and these left and right upper through-holes 163 are holes through which the hinge pin 153 can extend.

The locking section 125 includes the left and right locking holes 136 formed in the lower case half 123, and the left and right locking claws 137 provided on the upper case half 122. The upper and lower case halves 122 and 123 can be retained in a closed position by the left locking claw 137 being engaged in the left locking hole 136 and the right locking claw 137 being locked in the right locking hole 136.

The opening portion 27 is formed in the front wall portion (i.e., upper and lower front wall portions 156 and 132) and coaxially with the cassette gas cylinder 21 accommodated therein. The opening portion 27 has a smaller diameter than the mouthpiece portion 61 (more specifically, the flange 72) of the cassette gas cylinder 21. Thus, an annular abutment portion 168 capable of abutting against the flange 72 of the cassette gas cylinder 21 is formed on a front wall portion 26c of the gas cylinder case 26.

The annular groove 126, which comprises the lower annular groove portion 141 and upper annular groove portion 142, is formed in a rear end portion of an inner peripheral wall surface of the gas cylinder case 26. More specifically, the annular groove 126 is formed adjacent to an annular slanting wall portion 167 having an inner surface gradually slanting outwardly and forwardly (i.e., having an inner diameter gradually increasing toward the front). Bottom portion 21c of the cassette gas cylinder 21 is held in abutment against the inner surface of the slanting wall portion 167.

The annular slanting wall portion 167 is provided for pushing forward the bottom portion 21c of the cassette gas cylinder 21 as the upper and lower case halves 122 and 123 are closed. By the slanting wall portion 167 pushing forward the bottom portion 21c of the cassette gas cylinder 21, the cassette gas cylinder 21 is appropriately retained within the gas cylinder case 26 with the mouthpiece portion 61 (more specifically, the flange 72) abutted against the abutment portion 168 of the gas cylinder case 26.

Referring back to FIG. 5, the annular bulged portion 128 is formed in the front wall portion 26c of the gas cylinder case 26 concentrically with the opening portion 27 and annularly along the peripheral edge of the opening portion 27 (see also FIGS. 8 and 9).

Fitting recessed portion 170 is formed in one end portion of the gas cylinder case 26 to extend along the annular bulged portion 128 and coaxially with the axis of the gas cylinder case 26. Inner peripheral wall part 171 defining the fitting recessed portion 170 has a circular cross-sectional shape. As viewed in a longitudinal or axial sectional view, the inner peripheral wall part 171 has a wall thickness tapering in such a manner that its surface slants gradually outwardly toward a front or distal end 171a of the one end portion or the fitting recessed portion 170; that is, the inner peripheral wall part 171 gradually increases in inner diameter toward the front or distal end 171a. The surface of the inner peripheral wall part 171 can function as a mounting guide surface when the cylinder case 26 with the cassette gas cylinder 21 is to be mounted to the mouthpiece support section 42 of the receiver mechanism 25, as will be described later.

With the inner peripheral wall part 171 having such a tapering wall thickness, i.e. gradually increasing in inner diameter toward the front or distal end 171a, as viewed in an axial sectional view, the mouthpiece portion 61 of the cassette gas cylinder 21 can be readily guided, by the surface of the inner peripheral wall part 171 functioning as the mounting guide surface, into coaxial alignment with the mouthpiece support section 42 (see FIG. 4). Namely, with the inner peripheral wall part 171 gradually increasing in inner diameter toward the distal end 171a in the aforementioned manner, the distal end 171a of the fitting recessed portion 170 can have an increased inner diameter D. In this way, when the gas cylinder case 26 is to be mounted to the receiver mechanism (cylinder mounting mechanism) 25, the mouthpiece portion 61 of the cassette gas cylinder 21 accommodated in the gas cylinder case 26 can be readily mounted to the mouthpiece support section 42 without requiring much time and effort, by the human operator only appropriately positioning the inner peripheral wall part 171 with respect to the mouthpiece support section 42.

Figure 11:
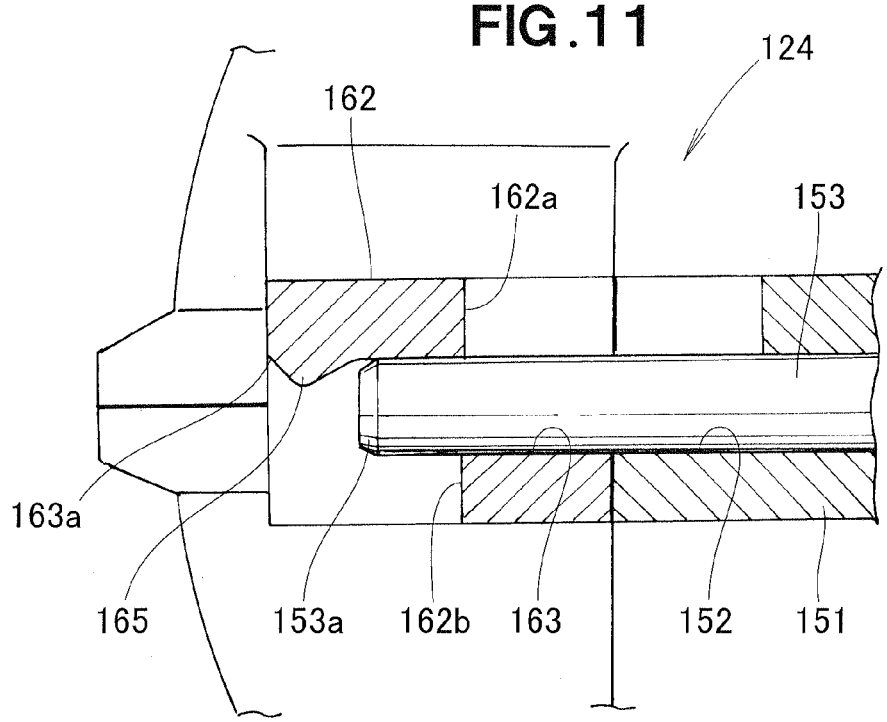
FIG. 11 is an enlarged view of a section encircled at 11 of FIG. 10.

FIG. 10 is a sectional view showing the hinge section 124 of the gas cylinder case 26 employed in the instant embodiment, and FIG. 11 is an enlarged view of a section encircled at 11 of FIG. 10.

The hinge section 124 includes the lower hinge portion 151 formed on the lower rear wall portion 133 of the lower case half 123, the upper hinge portion 161 (left and right upper hinge portions 162) formed on the upper rear wall portion 157 of the upper case half 122, the hinge pin 153 pivotably interconnecting the upper and lower hinge portions 161 and 151, and left and right come-off preventing projections 165 for preventing accidental come-off of the hinge pin 153 from the hinge portions 161 and 151.

The left upper hinge portion 162, which has the upper through-hole 163 formed therein, further has an outer recessed portion 162b formed in a lower outer end region thereof, an inner recessed portion 162a (see also FIG. 2) formed in an upper region thereof located closer to the middle of the left upper hinge portion 162 and the come-off preventing projection 165 formed on an outer end surface 163a defining an outer end portion of the upper through-hole 163.

The left come-off preventing projection 165 is disposed on a region of the outer end surface 163a opposed to the outer recessed portion 162b.

Because the left upper hinge portion 162 is constructed in such a manner that the inner recessed portion 162a and the outer recessed portion 162b are formed in the left upper hinge portion 162 and the left come-off preventing projection 165 is provided on the region opposed to the outer recessed portion 162b, not only the upper through-hole 163 but also the left come-off preventing projection 165 can be readily formed as the left upper hinge portion 162 is injection-molded of resin.

In the aforementioned manner, the left upper hinge portion 162 with the left come-off preventing projection 165 can be formed with ease. Note that the right upper hinge portion 162 is constructed and shaped in left-right symmetric relation to the left upper hinge portion 162, and thus, the following describe the right upper hinge portion 162 using the same reference numerals as used for the left upper hinge portion 162.

In the hinge section 124, the lower hinge portion 151 is disposed between and coaxially with the left and upper hinge portions 162, and the hinge pin 153 extends through the left and right upper through-holes 163 and the lower through-hole 152 of the lower hinge portion 151. Namely, the left and upper hinge portions 162 and the lower hinge portion 151 are pivotably mounted on the hinge pin 153.

The left and right come-off preventing projections 165 are formed on the surfaces of the left and right upper hinge portions 162 defining the left and right upper through-hole 163. The left come-off preventing projection 165 is disposed near a left end portion 153a of the hinge pin 153, while the right come-off preventing projection 165 is disposed near a right end portion 153b of the hinge pin 153.

Thus, the left and right come-off preventing projections 165 can be abutted against the left and right end portions 153a and 153b, respectively, of the hinge pin 153. In the aforementioned manner, the left and right come-off preventing projections 165 can prevent the hinge pin 153 from accidentally coming off from the hinge section 124, which can enhance the usability of the cassette gas cylinder mounting structure and hence the working machine.

Now, with reference to FIGS. 12-15, a description will be given about an example manner in which the cassette gas cylinder 21 is mounted to the receiver mechanism (i.e., cylinder mounting mechanism) 25.

Figure 12B:
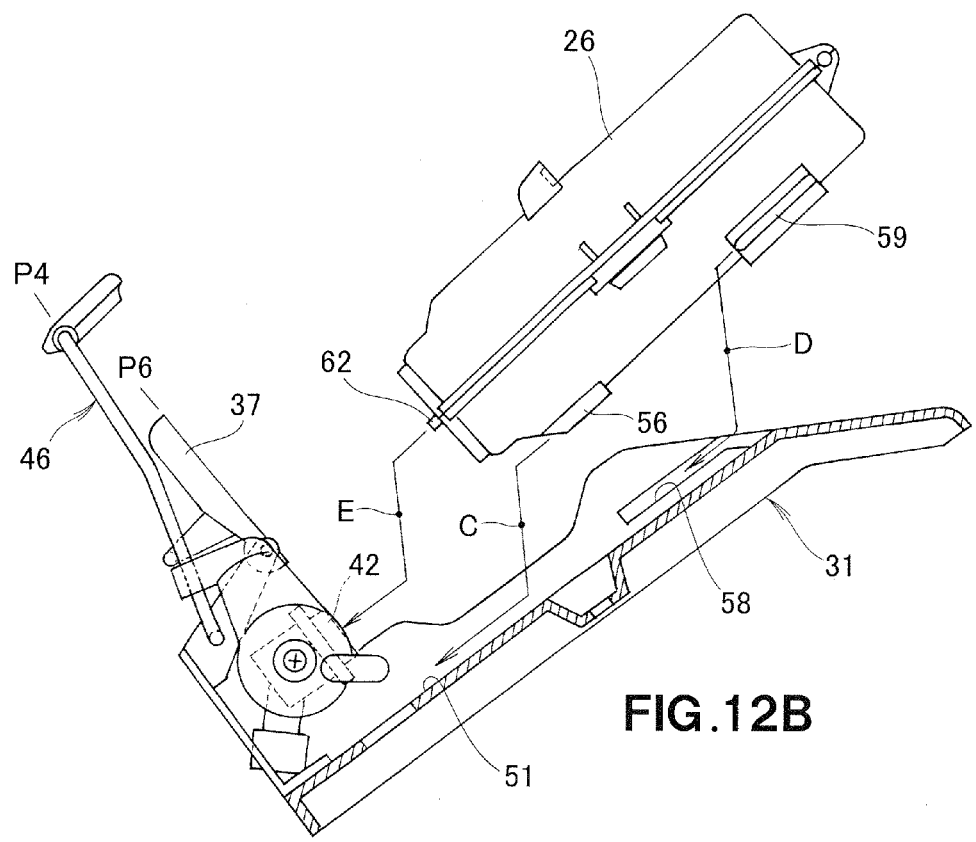

FIGS. 12A and 12B are explanatory of an example manner in which the case retaining section 34 is lifted to an evacuated position. As shown in FIG. 12A, the retaining rod 46 of the case retaining section 34 is normally urged, by the biasing force F1 of the spring member 49 (see FIG. 6), toward the bottom section 51 of the receiver body 31, so that the locking fastener 47 of the retaining rod 46 is kept pressed against the bottom section 51 of the receiver body 31 by means of the spring member 49.

Further, the shutter member 37 is abutted against the mouthpiece support section 42 by the spring force F2 of the shutter spring member 107 (see FIG. 6). In the aforementioned manner, the mouthpiece support section 42 is closed with the shutter member 37, so that it is possible to prevent foreign matters, such as sand and dust, from entering the mouthpiece support section 42 (particularly, the nozzle receiving portion 65).

In the aforementioned state, the human operator causes the retaining rod 46 to pivot upwardly about the proximal end portions 91*a* of the left and right leg portions 91 as indicated by an arrow A, so that the right leg portion 91 of the retaining rod 46 abuts against the projection 117 of the shutter interlocking section 38. As the retaining rod 46 continues to further pivot upwardly as indicated by the arrow A, the projection 117 moves upward in interlocked relation to the pivoting movement of the retaining rod 46. Thus, the shutter member 37 pivots upwardly about the support pin 106 as indicated by an arrow B.

Then, as shown in FIG. 12B, the retaining rod 46 evacuates to the cancellation position P4 above the receiver body 31, and the shutter member 37 moves upward to the opening position P6, in interlock relation to the evacuating movement of the retaining rod 46, so that the mouthpiece support section 42 is opened.

Also, the cylinder case 26 having the cassette gas cylinder 21 accommodated therein is brought close to the receiver mechanism 25, and the downward protruding portion 56 of the gas cylinder case 26 is placed on the bottom section 51 of the receiver body 31 as indicated by an arrow C. Simultaneously, the left and right sliders 59 (only the left slider 59 is shown) are inserted into the left and right slider guide portions 58 (only the right slider guide portion 58 is shown) as indicated by an arrow D.

In the aforementioned manner, the gas cylinder case 26 is mounted to the receiver body 31, so that the cassette gas cylinder 21 (see FIG. 9) within the gas cylinder case 26 is supported by the mouthpiece support section 42 as indicated by an arrow E.

Figure 13A:
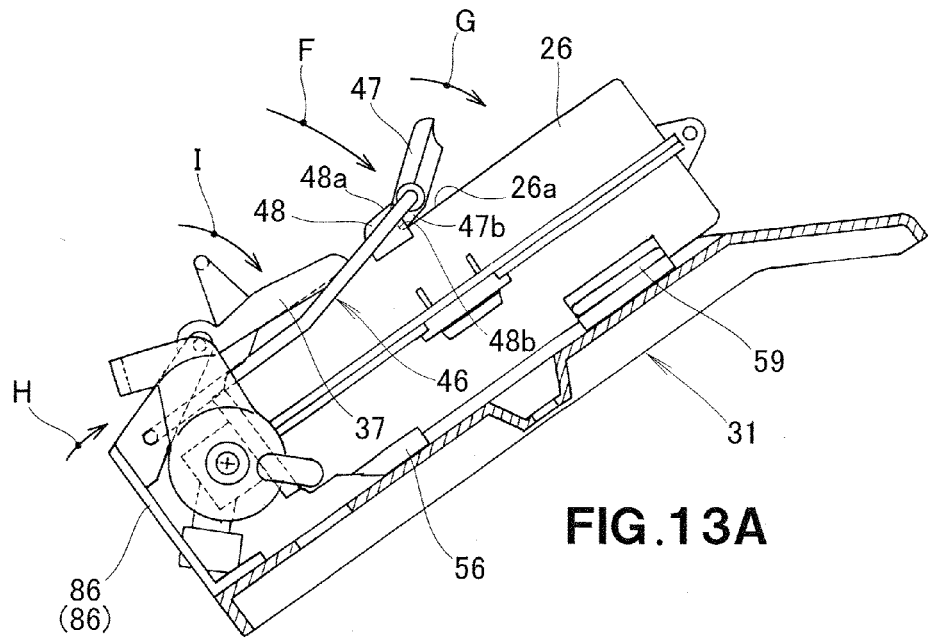
FIGS. 13A and 13B are views explanatory of an example manner in which the cassette gas cylinder is retained by the receiver mechanism.
Figure 13B:
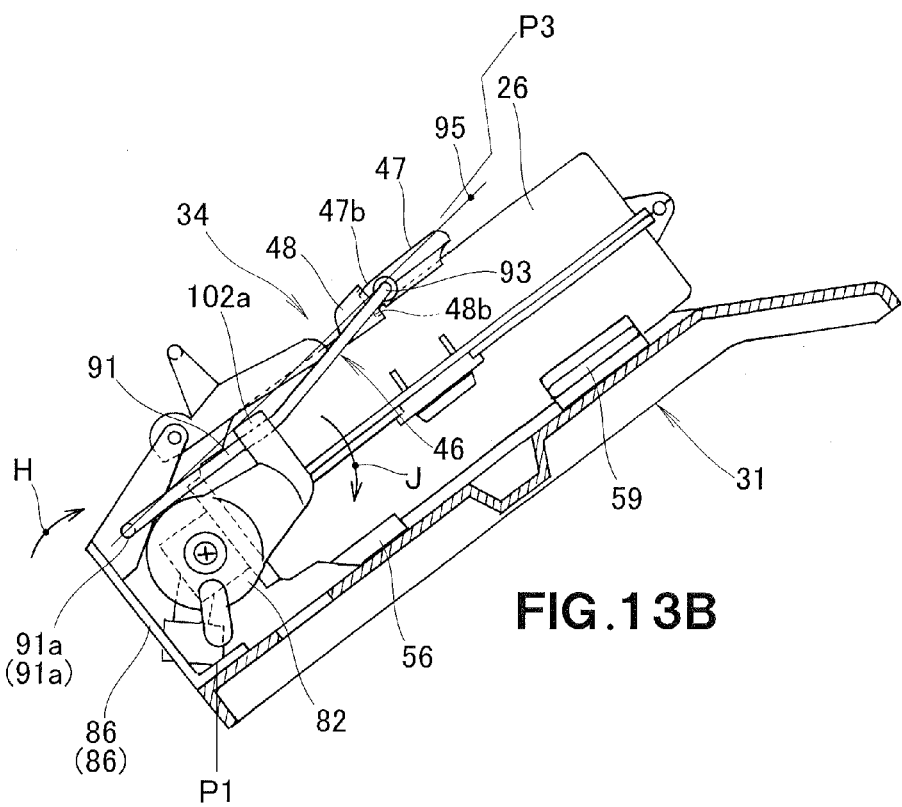

FIGS. 13A and 13B are views explanatory of an example manner in which the cassette gas cylinder 21 is retained by the receiver mechanism 25. As shown in FIG. 13A, the retaining rod 46 is caused to pivot downward by the biasing force F1 of the spring member 49 (see FIG. 6) as indicated by an arrow F, so that the locking end 47*b* of the locking fastener 47 abuts against the rear end portion 48*a* of the engaging portion 48.

Namely, as the locking fastener 47 moves as indicated by an arrow G, the locking end 47*b* is engaged in the engaging recess 48*b* of the engaging portion 48, during which time the left and right retaining force generation portions 86 of the support bracket 33 resiliently deform as indicated by an arrow H.

As the retaining rod 46 pivots downward by the biasing force F1 of the spring member 49 as indicated by the arrow F as noted above, the shutter member 37 lowers as indicated by an arrow I by the biasing force F2 of the shutter spring member 107 (see FIG. 6). Thus, the shutter member 37 abuts against the upper wall 26*a* of the gas cylinder case 26, so that the shutter member 37 is retained in the position where it has abutted against the shutter spring member 107.

Then, as shown in FIG. 13B, the retaining rod 47 is positioned in the retention position P3, and the gas cylinder 26 is retained by the case retaining section 34. Thus, with the locking end 47*b* engaged in the engaging recess 48*b* (see also FIG. 9), the connecting portion 93 is located below an imaginary line 95 connecting between the left and right proximal ends 91*a* and the locking end 47*b*, i.e. closer to the gas cylinder case 26 than the imaginary line 95.

In addition, a restoring force is produced in the left and right retaining force generation portions 86 resiliently deforming as indicated by an arrow H with the locking end 47*b* engaged in the engaging recess 48*b*, and the thus-produced restoring force acts on the locking fastener 47 via the retaining rod 46 so that the locking fastener 47 is pressed against the gas cylinder 26 by the restoring force. In this way, the locking end 47*b* is retained engaged in the engaging recess 48*b* of the engaging portion 48, and thus, the locking fastener 47 is retained in the engaged state.

By the restoring force acting on the cassette gas cylinder 21 (see FIG. 9) via the gas cylinder case 26, it is possible to absorb manufacturing and assembling errors and the like. In this way, the cassette gas cylinder 21 can be reliably retained by being reliably abutted against the mouthpiece support section 42 (see FIG. 12).

With the cassette gas cylinder 21 retained by the mouthpiece support section 42 in the aforementioned manner, the human operator shifts the operating lever 82 to the fuel supply position P1 as indicated by an arrow J, so that the bent portion 102*a* abuts against the retaining rod 46 (left leg portion 91). By the operating lever 82 being shifted to the fuel supply position P1 in the aforementioned manner, the fuel contained in the cassette gas cylinder 21 can be supplied to the gas engine 12.

Figure 14A:
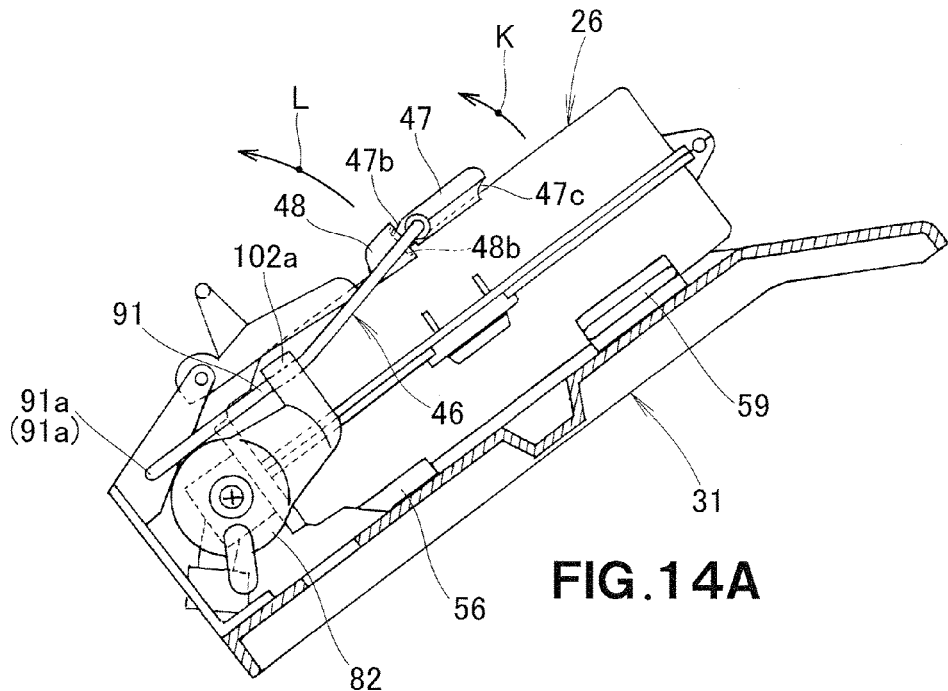
FIGS. 14A and 14B are views explanatory of an example manner in which a cylinder case retaining rod of the receiver mechanism is disengaged from the gas cylinder case.
Figure 14B:
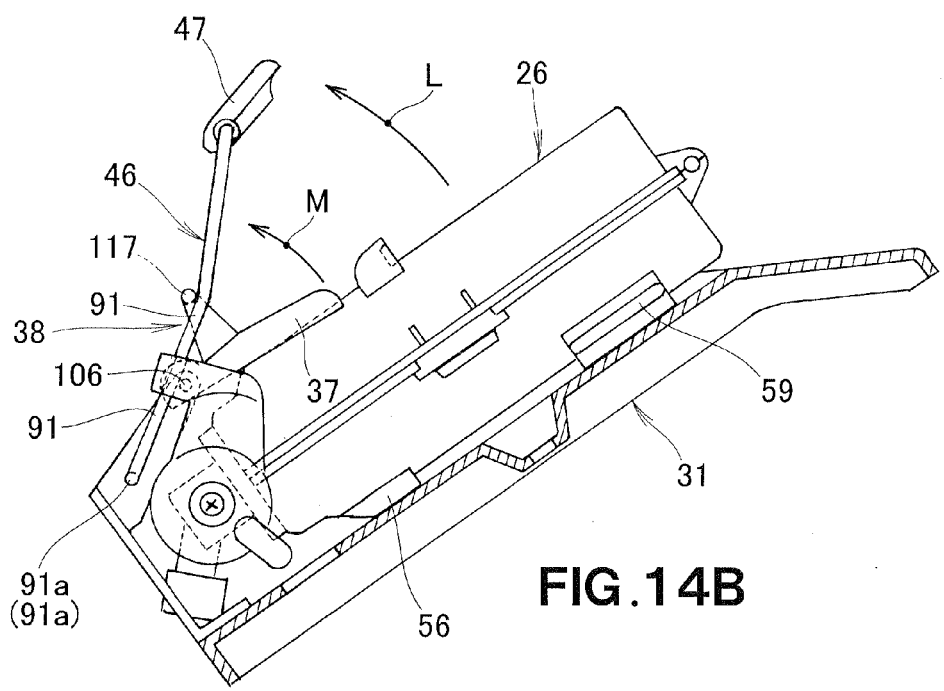

FIGS. 14A and 14B are views explanatory of an example manner in which the retaining rod 46 of the receiver mechanism 25 is disengaged from the gas cylinder case 26. As shown in FIG. 14A, the human operator puts his finger(s) on the finger-putting portion 47*c* to lift the locking fastener 47 as indicated by an arrow K and thereby disengage the locking end 47*b* of the locking fastener 47 from the engaging recess 48*b* of the engaging portion 48.

Then, the human operator pivots upwardly the retaining rod 46 about the left and right proximal ends 91*a* as indicated by an arrow L, so that the bent portion 102*a* is moved upward by the left leg portion 91 and the operating lever 82 is pivotally moved in interlocked relation to the movement of the bent portion 102*a*.

As the retaining rod 46 is caused to pivot upwardly about the left and right proximal ends 91*a* as indicated by the arrow L in FIG. 14B, the right leg portion 91 of the retaining rod 46 comes to abut against the projection 117 of the shutter interlocking section 38. Thus, as the retaining rod 46 continues to further upwardly pivot as indicated by the arrow L, the projection 117 moves upward in interlocked relation to the retaining rod 46. Namely, the shutter member 37 upwardly pivots about the support pin 106 as indicated by an arrow M.

Figure 15:
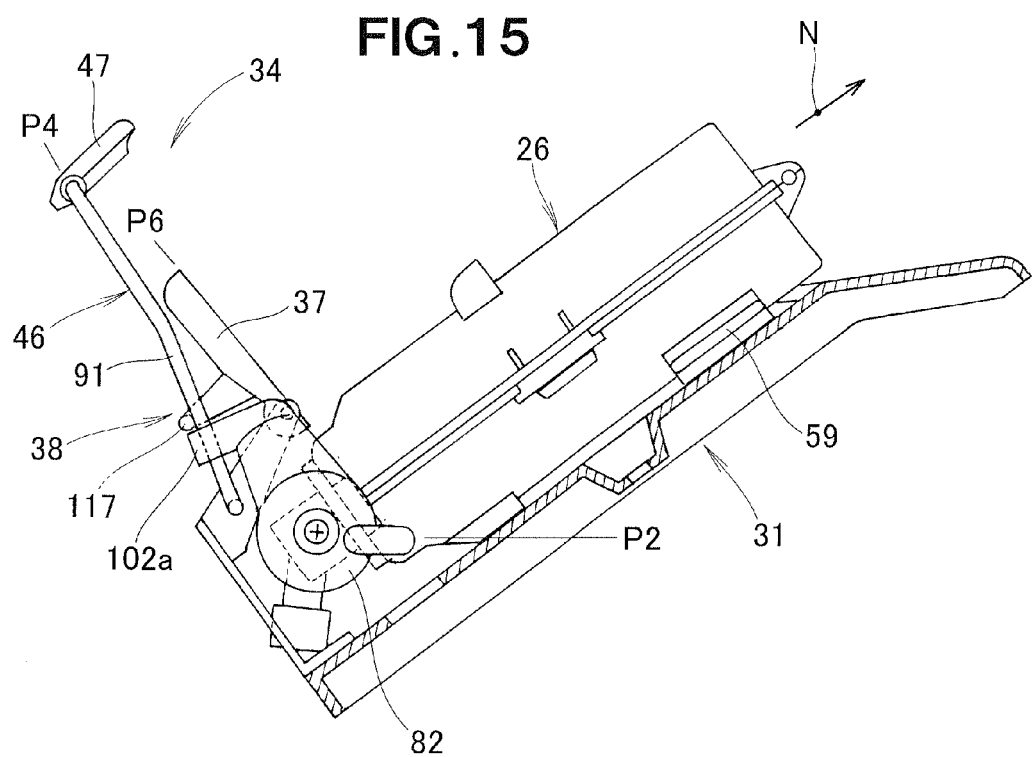
FIG. 15 is a view explanatory of an example manner in which the gas cylinder case is detached from the receiver mechanism.

FIG. 15 is a view explanatory of an example manner in which the gas cylinder case 26 is detached from the receiver mechanism 25. The human operator evacuates the retaining rod 46 to the cancellation position P4 above the receiver body 31, in response to which the shutter member 37 moves upward to the opening position P6 and thereby evacuates to above the gas cylinder case 26.

According to the instant embodiment of the gas cylinder mounting structure, as set forth above, the shutter interlocking section 38 can shift the shutter member 37 to the opening position P6, in interlocked relation to operation of the case retaining section 34, as the human operator operates the case retaining section 34 to cancel retention of the cassette gas cylinder 21. In this way, the instant embodiment can minimize time and labor for shifting the shutter member 37 to the opening position P6 and thereby significantly enhance the usability of the cassette gas cylinder mounting structure and hence the working machine.

Further, the operating lever 82 can be moved to the fuel block position P2 in response to movement of the bent portion 102a by the left leg portion 91. Thus, when canceling retention, by the case retaining section 34, of the cassette gas cylinder 21 (see FIG. 9), the operating lever 82 can be interlocked to the pivotal movement of the retaining rod 46 to switch the shifting valve 43 (see FIG. 4) from the fuel supply position to the fuel block position. Thus, when the gas cylinder case 26 is to be detached from the receiver body 31, there is no need to shift the shutter member 37 to the opening position.

In addition, when the gas cylinder case 26 is to be detached from the receiver body 31, the human operator need not separately operate the shifting valve 43 (operating lever 82). Thus, the gas cylinder case 26 can be readily detached from the receiver body 31 as indicated by an arrow N through simple operation.

Figure 16A:
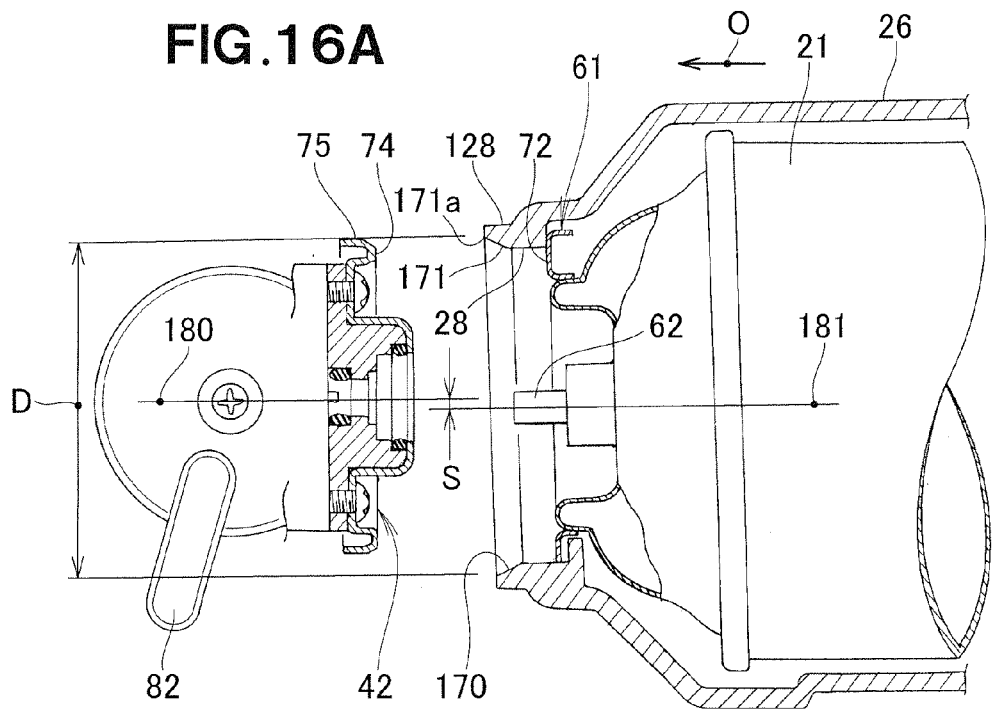
FIGS. 16A and 16B are views explanatory of an example manner in which a fitting recessed portion of the gas cylinder case is fitted over a mouthpiece support section.
Figure 16B:
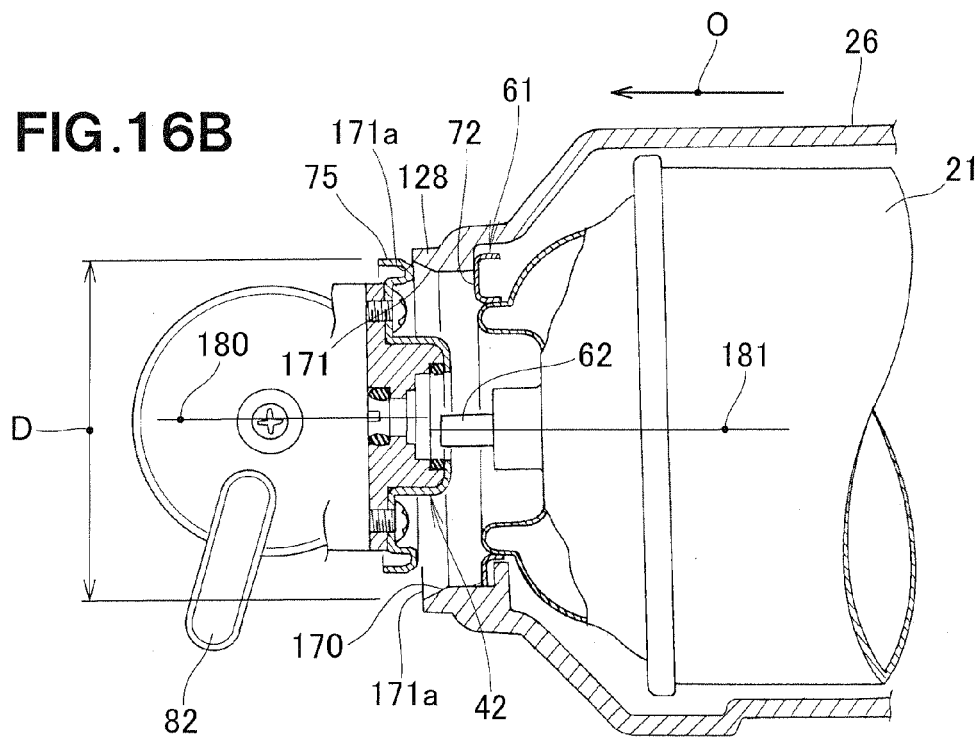

The following describe how the mouthpiece portion 61 of the cassette gas cylinder 21 is supported by the mouthpiece support section 42, with reference to FIGS. 16 and 17. FIGS. 16A and 16B are views explanatory of an example manner in which the fitting recessed portion 170 of the gas cylinder case 26 is fitted over the mouthpiece support section 42.

As shown in FIG. 16A, the annular bulged portion 128 (fitting recessed portion 170) of the gas cylinder case 26 is formed such that the surface of the inner peripheral wall part 171 gradually slants outwardly toward the distal or front end 171a, i.e. the inner peripheral wall part 171 gradually increases in inner diameter toward the distal end front end 171a. With the thus-formed inner peripheral wall part 171, the fitting recessed portion 170 has the increased inner diameter D at the distal end 171a.

When mounting the mouthpiece portion 61 of the cassette gas cylinder 21 to the mouthpiece support section 42 as indicated by an arrow O, it is conceivable that the center axis line 181 of the mouthpiece portion 61 is offset by a distance S (FIG. 16A) from the center axis line 180 of the mouthpiece support section 42.

However, in the instant embodiment, where the fitting recessed portion 170 has the increased inner diameter D at the distal end 171a, the fitting recessed portion 170 (distal end 171a) can be appropriately fitted over the mouthpiece support section 42 (more specifically, the outer peripheral wall portion 75) even where the center axis line 181 of the mouthpiece portion 61 is offset by a distance from the center axis line 180 of the mouthpiece support section 42.

Figure 17A:
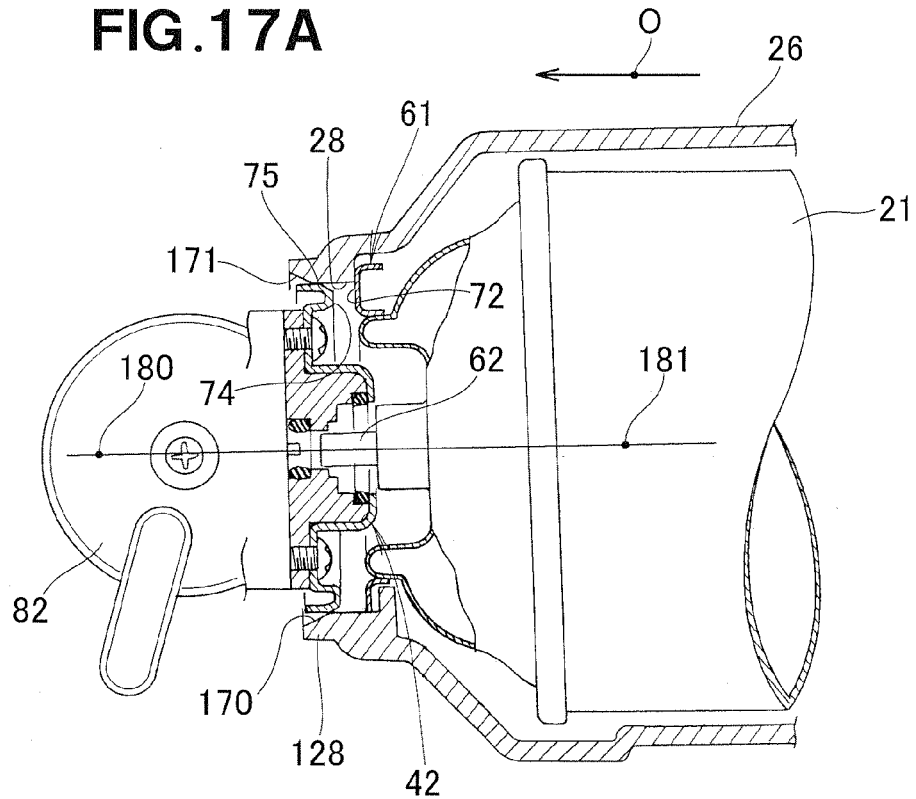
FIGS. 17A and 17B are views explanatory of an example manner in which the mouthpiece portion of the gas cylinder case is mounted to the mouthpiece support section.
Figure 17B:
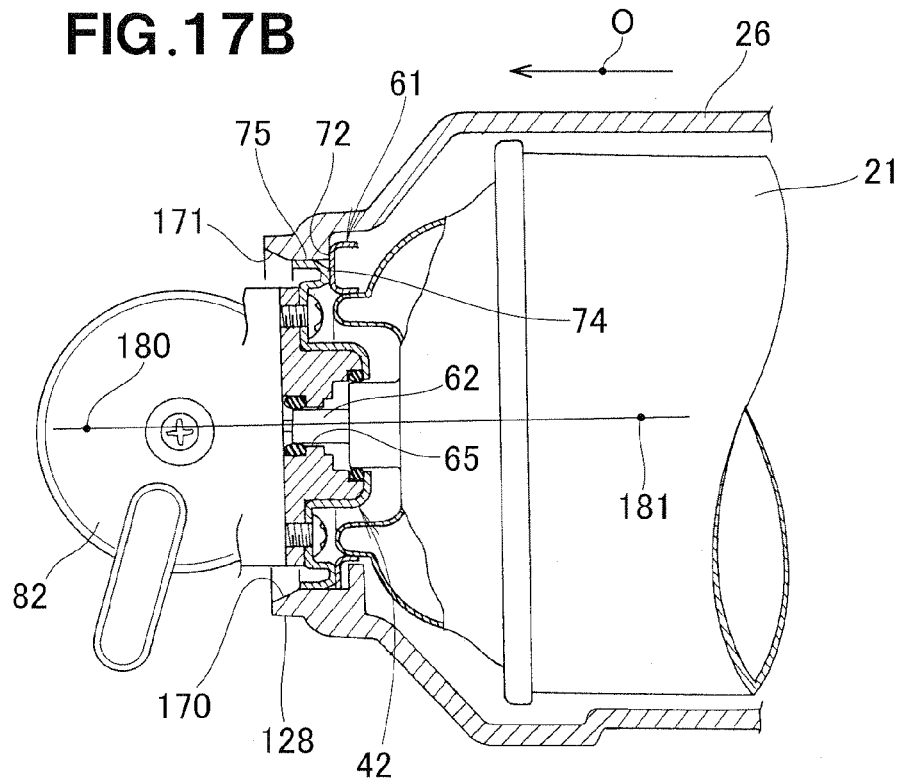

FIGS. 17A and 17B are views explanatory of an example manner in which the mouthpiece portion of the gas cylinder 21 accommodated in the cylinder case 26 is mounted to the mouthpiece support section 42. As shown in FIG. 17A, the inner peripheral wall part 171 has the aforementioned tapering wall thickness as viewed in an axial sectional shape. Thus, the mouthpiece portion 61 can be readily guided into axial alignment with the mouthpiece support section 42 by the human operator only roughly positioning the tapering peripheral wall part 171 with respect to the outer peripheral wall portion 75.

As shown in FIG. 17B, the inner peripheral wall portion 28 of the gas cylinder case 26 is fitted over the top portion 74 and outer peripheral wall portion 75 of the mouthpiece support section 42. The mouthpiece portion 61 can be appropriately supported by the mouthpiece support section 42 by the top portion 74 of the mouthpiece support section 42 abutting against the flange 72 of the mouthpiece portion 61.

Namely, with the inner peripheral wall part 171 with its inner diameter gradually increasing toward its front or distal end, the mouthpiece portion 61 of the cassette gas cylinder 21 accommodated in the gas cylinder case 26 can be readily mounted to the mouthpiece support section 42 without requiring much time and effort.

Further, the opening portion 27 of the gas cylinder case 26 can be hermetically closed with the outer peripheral wall portion 75 by the inner peripheral wall portion 28 fitting into the outer peripheral wall portion 75. In this way, the mouthpiece support section 42 can be closed with the gas cylinder case 26, so that foreign matters, such as sand and dust, can be prevented from entering the mouthpiece support section 42 (particularly, the nozzle receiving portion 65).

Figure 18A:
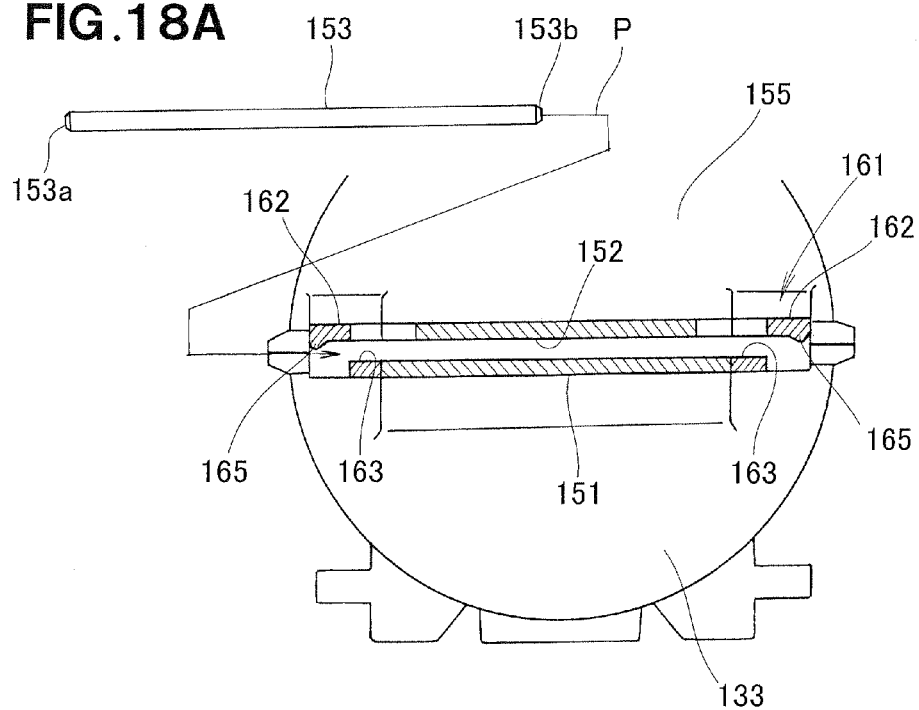
FIGS. 18A and 18B are views explanatory of an example manner in which a hinge pin is inserted into upper hinge portions of a hinge section.
Figure 18B:
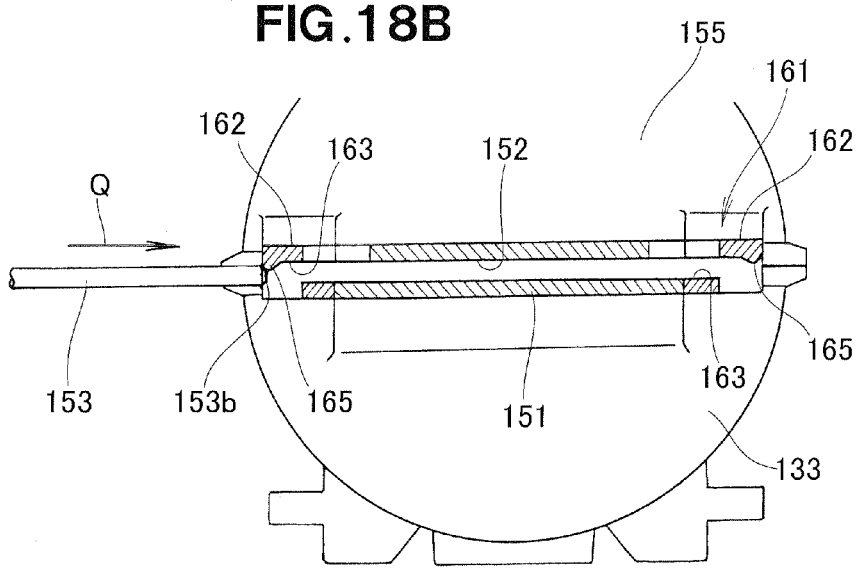

The following describe an example manner in which the hinge pin 153 is mounted to the hinge section 124, with reference to FIGS. 18 and 19. FIGS. 18A and 18B are views explanatory of an example manner in which the hinge pin 153 is inserted into the upper hinge portions 162 of the hinge section 124.

As shown in FIG. 18A, the human operator positions the lower hinge portion 151 between and coaxially with the left and upper hinge portions 162 and then inserts the hinge pin 153 into the left upper hinge portion 162 as indicated by an arrow P.

Then, as shown in FIG. 18B, the human operator inserts the right end portion 153b of the hinge pin 153 into the left upper through-hole 163 so that the right end portion 153b abuts it against the left come-off preventing projection 165. Then, the human operator pushes the hinge pin 153 deeper into the left upper through-hole 163 as indicated by an arrow Q while resiliently deforming or crushing the left come-off preventing projection 165 via the right end portion 153b of the hinge pin 153.

Figure 19A:
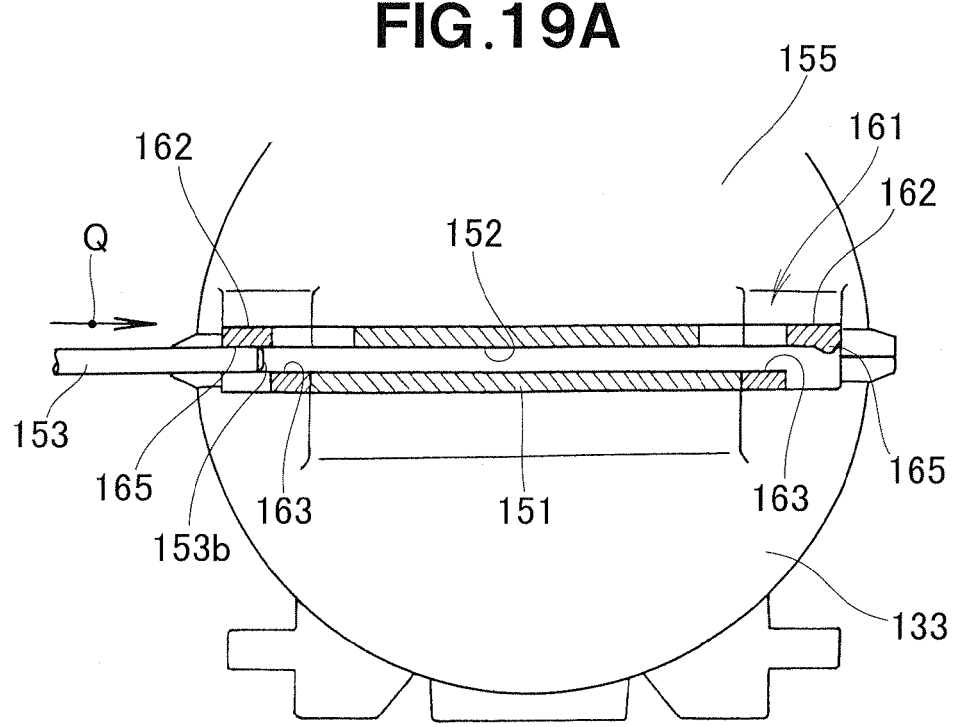
FIGS. 19A and 19B are views explanatory of an example manner in which the upper hinge portions and lower hinge portion of the hinge section are interconnected via the hinge pin.
Figure 19B:
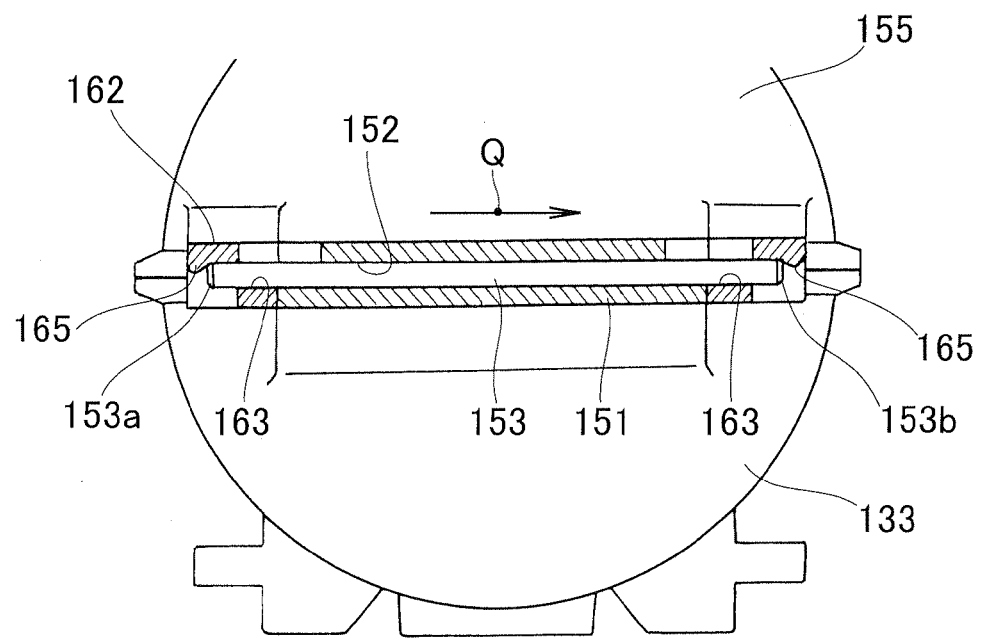

FIGS. 19A and 19B are views explanatory of an example manner in which the upper hinge portions 162 and the lower hinge portion 151 are interconnected via the hinge pin 153. As shown in FIG. 19A, the human operator pushes the hinge pin 153 further deeper into the left upper through-hole 163 as indicated by the arrow Q with the left come-off preventing projection 165 resiliently deformed or crushed.

Then, as shown in FIG. 19B, the human operator continues to further push the hinge pin 153 into the left upper through-hole 163 as indicated by the arrow Q, so that the hinge pin 153 passes through the through-hole 163 and the right end portion 153b of the hinge pin 153 reaches the upper through-hole 163 of the right upper hinge portion 162. Then, the right end portion 153b of the hinge pin 153 abuts against the right come-off preventing projection 165.

Then, once the left end portion 153a of the hinge pin 153 gets over the left come-off preventing projection 165, the left come-off preventing projection 165 is restored from the crushed state into its original projecting state, and the thus-restored left come-off preventing projection 165 abuts against the left end portion 153a of the hinge pin 153. In this way, the upper hinge portion 161 (left and right upper hinge portion 162) and the lower hinge portion 151 are interconnected via the hinge pin 153.

Because the left come-off preventing projection 165 is provided near the left end portion 153a of the hinge pin 153 while the right come-off preventing projection 165 is provided near the right end portion 153a of the hinge pin 153, the left and right come-off preventing projections 165 can effectively prevent the hinge pin 153 from accidentally coming off from the hinge section 124, which can enhance the usability of the cassette gas cylinder mounting structure and hence the working machine.

It should be appreciated that the cassette gas cylinder mounting structure of the present invention is not limited to the above-described preferred embodiment and may be modified or changed as necessary. For example, whereas the preferred embodiment has been described as applied to a walk-behind cultivating machine, the present invention may be applied to other types of working machines, such as lawn mowing machines, outboard engines, power generators, etc.

Furthermore, whereas the inner peripheral wall part 171 of the fitting recessed portion 170 has been described as having a circular cross-sectional shape, it may be of any other cross-sectional shape, such as a polygonal cross-sectional shape.

Furthermore, the cassette gas cylinder 21, receiver mechanism 25, gas cylinder case 26, mouthpiece support section 42, mouthpiece portion 61, annular bulged portion 128, fitting recessed portion 170, inner peripheral wall part 171, etc. may be of other than the shapes described above and shown in the figures.

The basic principles of the present invention are well suited for application to cassette gas cylinder mounting structures where a cassette gas cylinder is accommodated in a cylinder case and the cylinder case is mounted to a cylinder mounting mechanism.

What is claimed is:

1. A cassette gas cylinder mounting structure for use in a working machine comprising:
   a cylinder case adapted to receive a cassette gas cylinder therein;
   a cylinder mounting mechanism provided in the working machine for mounting thereto the cylinder case, the cylinder mounting mechanism further including: a cylinder case mounting body, a cylinder case retaining rod pivotably mounted on the cylinder case mounting body and normally spring-urged toward the cylinder case mounting body so that the cylinder case can be resiliently pressed against the cylinder case mounting body;
   a mouthpiece support section provided in the cylinder mounting mechanism for supporting a mouthpiece portion of the cassette gas cylinder when accommodated in the cylinder case;
   a shutter member pivotably mounted on the cylinder case mounting body and normally spring-urged to close the mouthpiece support section while no cylinder case is being mounted to the cylinder mounting mechanism; and
   a fitting recessed portion provided in one end portion of the cylinder case and capable of receiving the mouthpiece support section, the fitting recessed portion being defined by an inner peripheral wall part of the one end portion that has a wall thickness tapering so that a surface of the inner peripheral wall part slants gradually outwardly toward a distal end of the fitting recessed portion,
   whereby, when the cylinder case having the cassette gas cylinder accommodated therein is to be mounted to the cylinder mounting mechanism, the mouthpiece portion is automatically guided into coaxial alignment with the mouthpiece support section by the surface of the inner peripheral wall part functioning as a mounting guide surface.

2. The cassette gas cylinder mounting structure of claim 1, which further comprises an interlocking section for interlocking the shutter member to the cylinder case retaining rod.

\* \* \* \* \*